(12) United States Patent
Beaulieu

(10) Patent No.: US 9,972,205 B2
(45) Date of Patent: May 15, 2018

(54) REMOTE CONTROLLED MOBILE TRAFFIC CONTROL SYSTEM AND METHOD

(71) Applicant: Leo Beaulieu, Moose Jaw, CA (US)

(72) Inventor: Leo Beaulieu, Moose Jaw, CA (US)

( * ) Notice: Subject to any disclaimer, the term of this patent is extended or adjusted under 35 U.S.C. 154(b) by 0 days. days.

(21) Appl. No.: 15/362,379

(22) Filed: Nov. 28, 2016

(65) Prior Publication Data

US 2017/0154524 A1    Jun. 1, 2017

(30) Foreign Application Priority Data

Nov. 27, 2015  (CA) ...................... 2913284

(51) Int. Cl.
| | |
|---|---|
| *G08G 1/07* | (2006.01) |
| *G08G 1/0955* | (2006.01) |
| *G08G 1/087* | (2006.01) |
| *H04W 4/02* | (2018.01) |
| *H04L 29/08* | (2006.01) |
| *E01F 9/30* | (2016.01) |

(Continued)

(52) U.S. Cl.
CPC .................. *G08G 1/07* (2013.01); *E01F 9/30* (2016.02); *E01F 9/60* (2016.02); *E01F 9/65* (2016.02); *E01F 9/662* (2016.02); *G08G 1/087* (2013.01); *G08G 1/0955* (2013.01); *H04L 67/00* (2013.01); *H04L 67/18* (2013.01); *H04W 4/02* (2013.01); *H04W 4/023* (2013.01); *H04L 67/12* (2013.01)

(58) Field of Classification Search
CPC ............ G08G 1/07; G08G 1/075; G08G 1/09; G08G 1/091; G08G 1/0955
See application file for complete search history.

(56) References Cited

U.S. PATENT DOCUMENTS 3,473,623 A * 10/1969 Meek, Jr. .................. B62B 3/12
                                                                    180/167
3,721,819 A *  3/1973 Samrok .................... G08G 3/00
                                                                    246/118

(Continued)

FOREIGN PATENT DOCUMENTS

CN           2600892        1/2004
CN          201354444       12/2009

(Continued)

*Primary Examiner* — Hai Phan
*Assistant Examiner* — Son M Tang
(74) *Attorney, Agent, or Firm* — Kyle E Satterthwaite; Ryan W Dupuis; Ade & Company Inc

(57) ABSTRACT

A remote controlled mobile traffic control system which can be used in the place of a human flag person. A mobile platform with an adjustable traffic control indicator thereon is controlled by a remote control. The operator can move the platform and change the indication of the traffic control apparatus from a safe distance. The apparatus permits "flagging" of traffic in a moving traffic control zone arrangement, and operational safety is maximized. A traffic barrier arm is movable between deployed and retracted positions obstructing the path of oncoming traffic, for example by a remote controlled actuator or by remote controlled turning of the platform. A remote alarm unit accompanies to the work crew to alarm them of traffic entering the work zone without authorization or at unsafe speed. The apparatus can travel with a moving or changing work zone, either by human remote control or autonomous "follow me" functionality.

3 Claims, 20 Drawing Sheets

(51) Int. Cl.
*E01F 9/60* (2016.01)
*E01F 9/65* (2016.01)
*E01F 9/662* (2016.01)

(56) References Cited

U.S. PATENT DOCUMENTS

| | | | | |
|---|---|---|---|---|
| 3,886,519 A * | 5/1975 | Hovland | ................ | E01F 13/06 |
| | | | | 116/63 P |
| 4,206,550 A | 6/1980 | Boyett et al. | | |
| 4,657,104 A * | 4/1987 | Holland | ................ | B25J 5/007 |
| | | | | 180/211 |
| 4,777,751 A * | 10/1988 | Pasquale | ................ | E01F 1/005 |
| | | | | 182/17 |
| 4,937,795 A * | 6/1990 | Motegi | ................ | A41D 13/00 |
| | | | | 340/539.1 |
| 5,097,790 A * | 3/1992 | Massey | ................ | E01F 13/06 |
| | | | | 116/303 |
| 5,422,638 A * | 6/1995 | Singer | ................ | G08G 1/095 |
| | | | | 116/63 P |
| 5,466,088 A * | 11/1995 | Nasatka | ................ | E01F 13/08 |
| | | | | 404/6 |
| 5,805,081 A * | 9/1998 | Fikacek | ................ | G08G 1/0955 |
| | | | | 340/906 |
| 5,900,826 A * | 5/1999 | Farber | ................ | G08G 1/0955 |
| | | | | 116/63 P |
| 5,986,576 A * | 11/1999 | Armstrong | ................ | F21V 21/06 |
| | | | | 116/63 P |
| 6,104,313 A * | 8/2000 | Boyd, II | ................ | E01F 9/65 |
| | | | | 116/63 R |
| 6,118,388 A * | 9/2000 | Morrison | ................ | G08G 1/0955 |
| | | | | 340/907 |
| 7,098,807 B2 * | 8/2006 | Seguin | ................ | E01F 9/669 |
| | | | | 340/907 |
| 7,333,029 B2 * | 2/2008 | Hammett | ................ | G08G 1/08 |
| | | | | 116/63 R |
| 7,388,515 B2 * | 6/2008 | Hill | ................ | E01F 9/662 |
| | | | | 340/908 |
| 7,902,998 B2 * | 3/2011 | Wheaton | ................ | G09F 7/18 |
| | | | | 340/908 |
| 8,570,189 B1 * | 10/2013 | Casebolt | ................ | G08G 1/0112 |
| | | | | 340/901 |
| 8,711,004 B2 * | 4/2014 | Gabara | ................ | E01F 7/00 |
| | | | | 340/908 |
| 9,199,825 B2 | 12/2015 | Dueckman | | |
| 9,235,210 B2 | 1/2016 | Zhang | | |
| 9,365,987 B2 | 6/2016 | Christiansen et al. | | |
| 9,601,012 B2 * | 3/2017 | Williams | ................ | G08G 1/07 |
| 2001/0048845 A1 * | 12/2001 | Jack | ................ | E01F 13/06 |
| | | | | 404/6 |
| 2002/0154947 A1 * | 10/2002 | Farritor | ................ | E01F 15/006 |
| | | | | 404/6 |
| 2005/0270373 A1 * | 12/2005 | Trela | ................ | H04N 7/18 |
| | | | | 348/143 |
| 2007/0290887 A1 * | 12/2007 | Pleasanton | ................ | G08G 1/0955 |
| | | | | 340/908 |
| 2010/0026520 A1 * | 2/2010 | Witte | ................ | G08G 1/07 |
| | | | | 340/908 |
| 2011/0133038 A1 * | 6/2011 | Kiss, Jr. | ................ | B61L 29/24 |
| | | | | 246/126 |
| 2012/0118718 A1 * | 5/2012 | Geiger | ................ | H01H 36/004 |
| | | | | 200/5 A |
| 2012/0262304 A1 * | 10/2012 | Cripps | ................ | G08G 1/0955 |
| | | | | 340/908 |
| 2015/0040445 A1 | 2/2015 | Li | | |
| 2016/0122956 A1 * | 5/2016 | Christiansen | ........ | B60P 3/0255 |
| | | | | 180/2.2 |
| 2017/0015336 A1 * | 1/2017 | Bartek | ................ | B61L 23/06 |
| 2017/0061791 A1 * | 3/2017 | Cherewka | ........ | G08G 1/0955 |

FOREIGN PATENT DOCUMENTS

| | | |
|---|---|---|
| CN | 201713769 | 1/2011 |
| DE | 3709662 | 10/1988 |

* cited by examiner

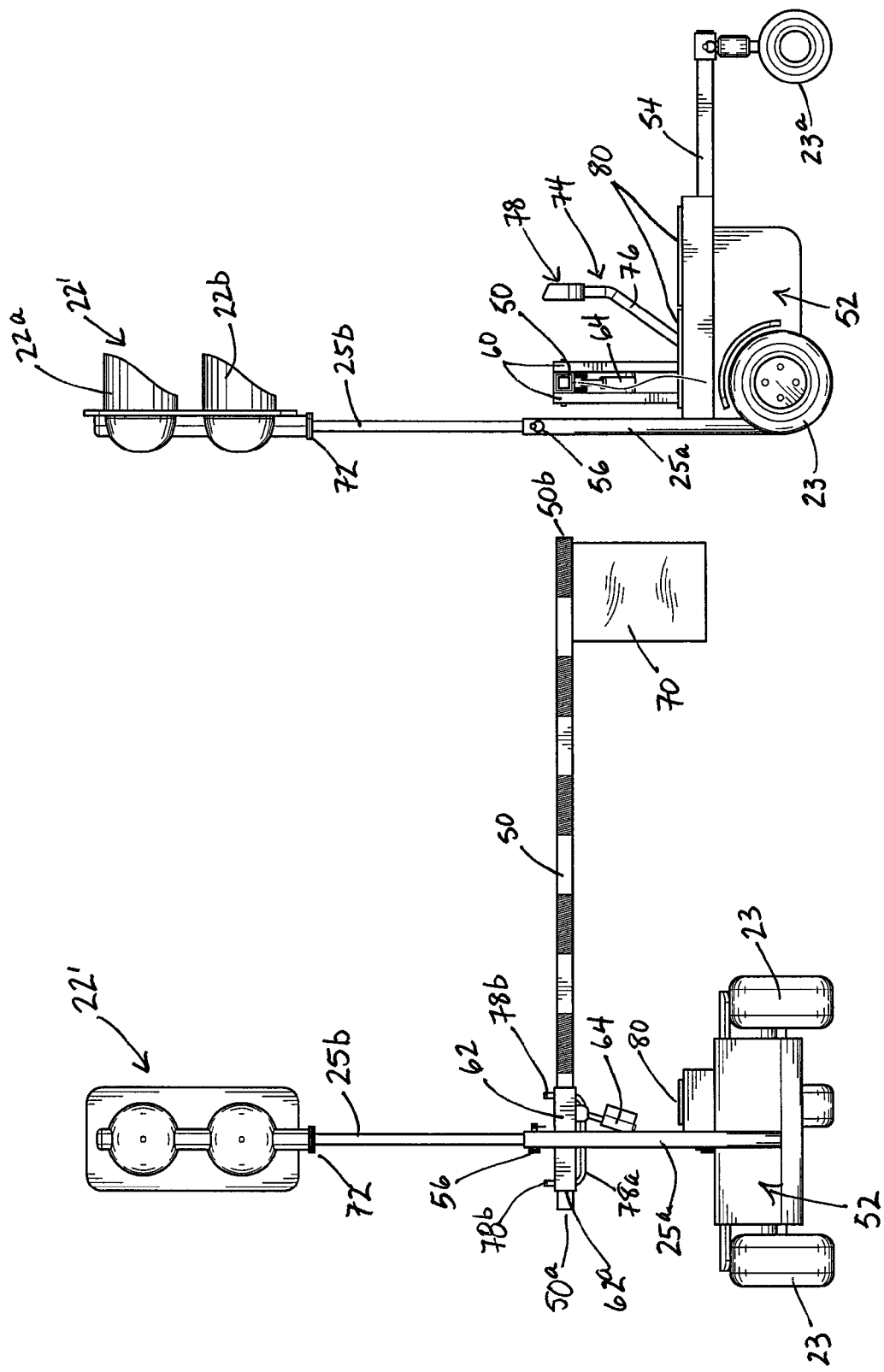

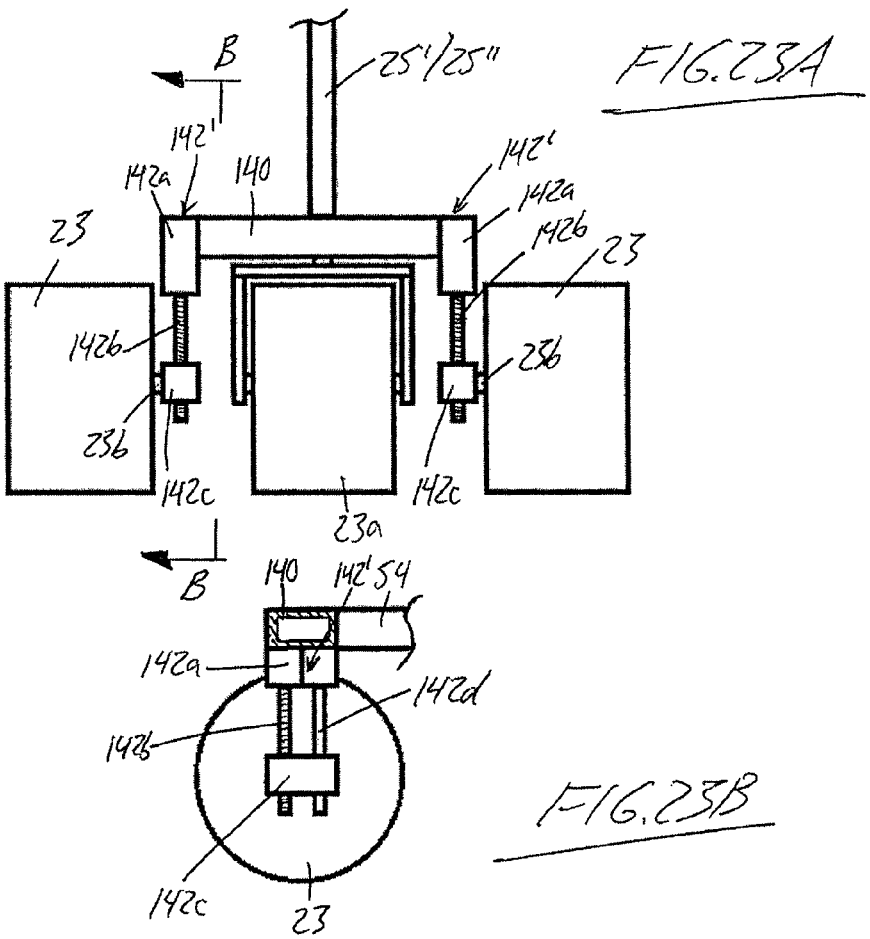
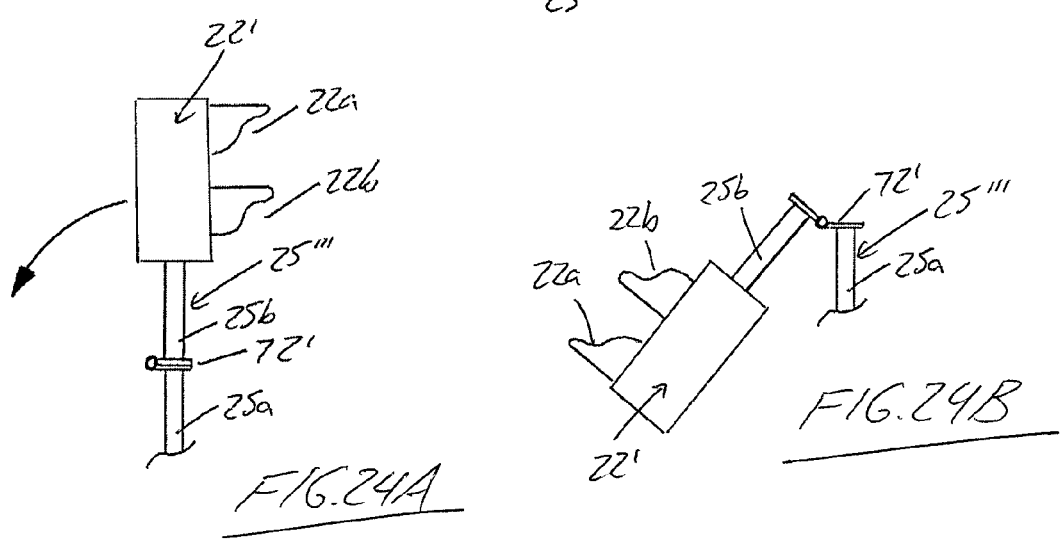

REMOTE CONTROLLED MOBILE TRAFFIC CONTROL SYSTEM AND METHOD

FIELD OF THE INVENTION

This invention is in the field of road construction and other traffic control situations including emergency services or the like, and more specifically comprises a remote controlled mobile traffic control apparatus which can be used in the place of a human flag person. The apparatus allows for maximized safety in construction zones and other traffic control areas where there is vehicular traffic, either stationary or mobile in nature.

BACKGROUND

There are many industrial applications in which remote control technology can be developed or implemented to maximize efficiency and safety. It is believed that one area in which such technology can be created is that of traffic control in construction or other areas with vehicular traffic.

Traditionally, in construction zones, accident areas or the like, human flag people have been used to provide indications of traffic flow status and the like. In many cases a two sided paddle-like sign is used, providing the flag person with two indications of status they can provide to vehicles moving in their proximity (for example two signs indicating STOP or PROCEED etc.) Many different types of signs have been developed and used over time in this regard.

One of the primary risks associated with human flagging of traffic is simply the danger associated with the position of the flagman in vehicular traffic. Often the flagman finds themselves standing in fast-moving or erratic traffic, which can be dangerous and in fact many flag people have been killed or seriously injured over the years in these types of jobs. If there was a way to minimize the likelihood of personal injury in traffic flagging applications it is believed this would be considered desirable in industry. If there were a way of simplifying traffic control or flagging within a moving work zone which also maximized human safety, this would be desired as a means of extricating some of the human workers from such areas as road construction zones, traffic control areas around accidents and special events, etc.

A further complicating factor in the flagging or control of traffic arises in a moving work zone—for example, while many traffic control areas for example around an accident, traffic restriction or the like are stationary—that is to say they do not move during their placement—other traffic control zones can be moving. For example if a work crew is paving or otherwise servicing a road surface with moving equipment, the entire crew and work zone may move steadily along the road surface as they work, resulting in the need for traffic control signage and personnel to stay in proximity to the work area. A human flag person would simply walk along the road surface or drive a vehicle between temporary stopping locations or the like, to maintain their position in relation to the work area. In certain applications, safety concerns for the flagperson mandate the placement of temporary road signage, which then needs to be moved along the road as the work zone moves as well.

Either in a moving work zone, or as the lineup of traffic constricted in the area extends, the visibility of the traffic control signs or flagperson decreases. A moveable sign would be desirable from the perspective of the maximization of visibility and safety, since the mobile controller could move along the traffic line with another mobile or even a stationary controller at the front of the line. This would allow for the mobile controller to remain at the front of the traffic line.

There have been attempts at automating the traffic flagging process in the past but they appear limited to the stationary placement of a traffic control or indication apparatus in a particular work zone. For example, the invention disclosed in U.S. Pat. No. 6,104,313 discloses a stationary platform with a remote controlled vertical paddle sign thereon, which can be remotely triggered to change its indication. This would allow an operator to not be in direct proximity and in a risk area while operating a traffic flagging indicator. However the utility of this device is limited in any kind of a traffic control situation where it is desirable or required to move the flagging apparatus during a working session between physical ground locations. If it was required to move or set up the flagging apparatus in the manner disclosed in said patent, erection or placement of the apparatus at a chosen location is a required task. If the device needs to be moved, it needs to be taken out of service, moved to the new selected location and reactivated.

Other attempts at traffic control or flagging apparatus in the prior art, to address the situation of a moving work zone or the like, comprise traffic control signs either mounted or towed by a motor vehicle. The necessity for the flagperson to have an extra motor vehicle at the construction site, and in the traffic pattern, is again less than optimal from a safety as well as a resource utilization perspective. In addition, it has been shown that tow vehicles left hitched to flagging devices tend to mask the silhouette of the auto flaggers, reducing the visual impact and resulting in some drivers tending to pass around the auto-flagger, rendering the device far less effective. If it were possible to create a wireless remote controlled mobile traffic control or flagging device that allowed for the change of a traffic indicator to oncoming traffic without the need for a human attendant to be present tending the traffic indicator directly or otherwise exposed to the danger of oncoming traffic this would be desirable.

Furthermore if it were possible to create a wireless remote controlled mobile traffic control or flagging device that could work in stationary as well as moving work or control zones, this would be further desirable from the perspective of further limiting the need or the presence of human traffic control personnel on the surface in oncoming traffic for as much of the time as possible.

SUMMARY OF THE INVENTION

Embodiments of the present invention include a remote controlled mobile traffic control platform which can be used in a temporary traffic control zone in the place of a human flag person that is conventionally placed in a working position directly or closely exposed to the oncoming traffic.

It is desired to provide a remote controlled mobile traffic control platform and apparatus which will allow for an operator to remotely control a traffic indication without the need to be directly in harm's way in the oncoming traffic flow.

It is the further desire of the present invention to provide a remote controlled mobile traffic control platform and apparatus which can be used in a moving traffic control zone and which can be moved between ground positions during its operation by remote control, and without the need for vehicular tow or assistance.

It is the further desire of the present invention to provide a remote controlled mobile traffic control platform and apparatus which can be controlled from a safe distance in line of sight using a wireless remote control.

According to one aspect of the invention, there is provided a remote controlled mobile traffic control apparatus comprising:
  a mobile platform;
  a locomotion system installed on the mobile platform to carry the mobile platform in a movable manner over a ground surface;
  a traffic control indicator mounted on the mobile platform and operable to display different traffic control indications to oncoming traffic approaching said mobile platform; and a control module installed on the mobile platform and operable to receive incoming signals from one or more remote devices communicable therewith from remote distances to switch between the different traffic control indications displayed to the oncoming traffic and move the mobile platform over the ground surface via the locomotion system.

The one or more remote control may include a wireless remote control capable of wirelessly positioning the platform as well as changing the indication shown to oncoming traffic, whereby the operator is untethered to the platform and can operate the apparatus from any location within a wireless range of the remote control. In such instance, an operator in a proximate but safe operating position, using the wireless remote control, can move the mobile platform between working locations as required, as well as change the traffic control indication displayed to oncoming traffic. The ability to move the traffic control apparatus within a work zone without the need to disassemble and reassemble it provides a significant efficiency enhancement and safety enhancement over the prior art. While many remote control devices are controlled using a hard wired remote control, the use of a wireless remote control approach further enhances safety in the work zone, insofar as a wired remote control would result in the need to tend and stay clear of a lengthy control cable in the work zone.

Preferably the different traffic control indications comprise a traffic stop indication and a traffic caution indication.

In one embodiment, the traffic control indicator may be rotatable vertically oriented signs such as those traditionally used in such applications or could also comprise other types of traffic control indications.

In another embodiment, the different traffic control indications comprise illuminated indications of different characteristic from one another, preferably differing in colour from one another, and/or in a continuous versus intermittently flashing state of illumination, for example using a continuous red illumination to convey a traffic stop message and a flashing yellow/amber illumination to convey a traffic caution message.

In one embodiment, a traffic control barrier is mounted or mountable on the mobile platform and movable relative thereto between deployed and retracted positions, and movable into and out of a deployed position obstructing a travel path of the oncoming traffic beside said mobile platform, wherein the control module is operable to transition the traffic control barrier into and out of said deployed position based on the incoming signals from the one or more remote devices.

In some embodiments, the traffic control barrier comprises a barrier arm pivotally supported or supportable on the mobile platform for pivotal movement between an orientation reaching laterally outward from the mobile platform in the deployed position and an orientation of lesser lateral extent when withdrawn from the deployed position.

The barrier arm may be pivotal upwardly and downwardly for raising and lowering of said barrier arm. Alternatively, the barrier arm may be pivotal about an upright axis to swing back and forth over the road surface into an out of the deployed position.

In other embodiments, the barrier arm is held stationary on the mobile platform in a position reaching outwardly to one side thereof, and the control module is arranged to turn the mobile platform into one of two differently facing directions using the locomotion system in response to incoming indicator control signals from the one or more remote devices in order to either face said one side toward the travel path of the oncoming traffic so that the barrier arm reaches into said travel path, or face said one side in another direction placing the barrier arm outside said travel path.

Each of the one or more remote devices is communicable with the control module and operable at said remote distances from the mobile platform to transmit to the control module drive control signals for movement of the mobile platform via the locomotion system and/or indicator control signals for switching between the different traffic control indications displayed to the oncoming traffic.

In one embodiment, the one or more remote devices include a motion sensing hand-held remote sized for carrying in one-hand of an operator and arranged to generate the drive control signals based on detected movement of the hand-held remote in said one-hand of the operator, leaving another hand of the operator free for other tasks.

In one embodiment, the hand-held remote and the control module are configured to correlate forward tiling of the hand-held remote with forward driving of the mobile platform, leftward tilting of the hand-held remote with left-hand turning of the mobile platform and rightward tilting of the hand-held remote with right-hand turning of the mobile platform.

One embodiment includes an alarm unit separate of, or separable from, the mobile platform for placement of said alarm unit at a work zone located down-road of the mobile platform and remotely of the one or more remote devices, said alarm unit being operable to emit an audible alarm warning one or more workers of a vehicle approaching the work zone in an unauthorized or unsafe manner. In such instance, said one or more remote devices may have a safety alarm actuator operable to transmit an alarm signal to the remote alarm unit to trigger the alarm at the remote alarm unit.

Preferably the audible alarm unit is operable to emit different alarm tones representing different safety hazard situations, for example different alarm tones corresponding to different directions from which the vehicle may approach the work zone.

In one embodiment, a second such remote controlled mobile traffic control apparatus is included, and the one or more remote devices comprise a respective remote control for each mobile traffic control apparatus, the respective remote controls of the two remote controlled mobile traffic control apparatuses each being operable to trigger a different one of the alarm tones at the alarm unit, whereby placement of the mobile platforms of the two apparatuses proximate different ends of the work zone with respective operators possessing the respective remote controls near said different ends of the work zone enables the different tones of the alarm unit to inform the one or more workers of which end of the work zone the vehicle is approaching from.

Preferably the alarm unit comprise a local alarm actuator operable at the alarm unit by one worker at the work zone to warn other workers within or near said work zone.

In one embodiment, the traffic control indicator is mounted atop a support that stands upright from the mobile platform, and the apparatus comprises a self-plumbing mechanism for orienting the support in a vertically upright position.

In one embodiment, the self-plumbing mechanism comprises a movable connection between the support and the mobile platform by which the support can tilt relative to the mobile platform, and a counter balance connected to the support below the movable connection, whereby tilting of the traffic control indicator in one direction out of the vertically upright position counteracted by the counter balance. The movable connection may comprise a multi-directional joint by which the support is tiltable in multiple directions relative to the mobile platform, for example a ball joint by which the support is tiltable relative to the mobile platform in any direction.

The counter balance may comprise one or more batteries connected to one or more electrical components of the apparatus for powering thereof.

Alternatively, the self-plumbing mechanism may comprise a platform tiling mechanism operable to adjust an angle of the platform relative to the ground surface to achieve a level state of the platform regardless of a slope or uneven state of said ground surface. In such instance, the locomotion system may comprise a plurality of ground engagement members depending downwardly from the mobile platform to engage the ground surface and movably carry the mobile platform thereon, and the platform tilting mechanism may comprise one or more actuators operable to raise and lower at least one of the ground engagement members relative to the mobile platform and relative to another of said ground engagement members.

In one embodiment, the locomotion system comprises three ground wheels movably carrying the mobile platform, said three wheels comprising two powered drive wheels operable in synchronous relation to one another for straight conveyance of the mobile platform and in differential relation to one another for turning conveyance of the mobile platform, and a non-powered caster wheel.

In one embodiment, the locomotion system comprises a disengagement mechanism operable to decouple one or more driven ground engagement members thereof from one or more motors of the locomotion system to reduce resistance to movement of the mobile platform by means other than said one or more motors of the locomotion system, for example by way of a tow vehicle coupled to the mobile platform by a hitch connector mounted thereon.

In such instance, there may be a hitch connector carried by the mobile platform for selective coupling thereof to a tow vehicle, whereby decoupling the one or more driven ground engagement members from the one or more motors using the disengagement mechanism provides improved ease of towing.

In one embodiment, one or more solar panels are carried on the mobile platform and operable to charge an onboard power supply that is carried by the mobile platform and powers one or more electrical components of the apparatus.

In one embodiment, the traffic control indicator is carried by a support shaft that stands upright from the mobile platform to carry the traffic control indicator at a spaced elevation thereabove, and the traffic control indicator is pivotally supported for movement between a working position standing upright from atop said support shaft and a tilted storage position of reduced elevation relative to the upright working position. In such instance, the traffic control indicator may tilt downwardly from the support shaft in the storage position.

The support shaft may be a telescopic support shaft with the traffic control indicator carried on an upper section of the telescopic support shaft that is extendable upwardly from a lower section of the telescopic support shaft to provide the traffic control indicator with increased elevation in the working position, wherein with the upper section of the telescopic support shaft in a lowered position and the traffic control indicator in the storage position, the traffic control indicator hangs downwardly alongside the lower section of the telescopic support.

Alternatively, the support shaft may be foldable such that the upper section of the support shaft on which the traffic control indicator is mounted is foldable downwardly from atop the lower section of the support shaft.

At least one of the remote devices may comprise a leader device, wherein said control module on the mobile platform is configured to autonomously drive the location system in a manner following movement of said leader device along the road surface. The control module on the mobile platform may be configured to maintain a predetermined distance between said mobile platform and said leader device.

The leader device may comprise a GPS tracker, with the control module on the mobile platform being configured to follow said leader device based upon detected travel of said leader device evidenced by changing GPS coordinates obtained by said GPS tracker.

According to another aspect of the invention, a method of remote-controlled mobile traffic control comprises positioning the remote control mobile traffic control apparatus recited in the first aspect of the invention within or in proximity to a work zone on the road surface, with its traffic indicator facing into oncoming traffic. Following positioning of the apparatus in the appropriate working position, an operator at a safe distance with a wireless remote control may actuate changes in the displayed traffic control indication, as well as commanding the movement of the traffic control apparatus in relation to the work zone, using the remote control.

According to another aspect of the invention, a method of remote-controlled traffic control comprises (a) positioning a mobile platform on or proximate a road surface at or proximate a starting end of a work zone with a traffic control indicator carried on said mobile platform to inform oncoming traffic approaching said work zone; and (b) using a remote device at a remote distance from said mobile platform to switch between different traffic control indications displayed by the traffic control indicator to the oncoming traffic; wherein positioning of said mobile platform at or proximate the starting end of the work zone in step (a), and/or subsequent repositioning of said mobile platform, is performed by a locomotion system on the mobile platform based on incoming signals received at said mobile platform from a remote distance away therefrom to command operation of the locomotion system.

In one instance, remote controlled repositioning of said remote-controlled mobile platform comprises moving the mobile platform along the road surface in accordance with expansion, contraction or movement of the work zone, whereby the starting end of the work zone changes location and the mobile platform travels with said changing end of the work zone.

In instance, remote controlled repositioning of said remote-controlled mobile platform comprises moving the mobile platform along the road surface away from said work zone as the oncoming traffic lines up before said starting end of the work zone, whereby lined up traffic further back from the work zone is informed by the traffic control indicator of the moving mobile platform. In such instance, a second traffic control point may be maintained at or proximate the starting end of the work zone, for example by a second remote-controlled mobile platform that has a second traffic control indicator carried thereon, in which case receipt of additional incoming signals at said second traffic control indicator from a location remote therefrom is used to control the oncoming traffic at said starting end of the work zone using said second traffic control indicator.

In one instance, remote controlled repositioning of said remote-controlled mobile platform comprises moving said remote-controlled mobile platform into the path of an oncoming vehicle that is exceeding a safe speed limit or attempting to enter the workzone without authorization, thereby presenting a stop-inducing crash hazard to said oncoming vehicle.

Repositioning of said mobile platform mobile platform may comprise autonomously operating the locomotion system in a manner following a leader device from which said incoming signals are being received. Such repositioning may include maintaining a pre-determined distance between said leader device and said mobile platform, and/or using changing GPS coordinates of said leader device to monitor movement thereof and have the mobile platform follow said movement.

BRIEF DESCRIPTION OF THE DRAWINGS

While the invention is claimed in the concluding portions hereof, preferred embodiments are provided in the accompanying detailed description which may be best understood in conjunction with the accompanying diagrams, where like parts in each of the several diagrams are labeled with like numerals, and where:

FIG. 11 is a front view of the apparatus of FIG. 9;

FIG. 12 is a side view of the apparatus of FIG. 9;

FIG. 23A is a front elevational view of another embodiment of the remote controlled mobile traffic control apparatus with a self-plumbing function, but instead of the pivotally supported shaft of the FIG. 18 embodiment, uses wheel raising and lowering actuators to vertically orient the support shaft when the platform is on sloped or uneven terrain.

FIG. 23B is a cross-section view of the apparatus of FIG. 23A as viewed along line B-B thereof.

FIGS. 24A and 24B show an alternate support shaft design employing pivotally coupled shaft sections rather than telescopically mated shaft sections for raising and lowering of the traffic control indicator.

DETAILED DESCRIPTION OF ILLUSTRATED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

Static Versus Moving Work Zones:

One problem addressed by the present invention is the need to provide a safer traffic control methodology for use in high danger or moving work zones on vehicular surfaces—the device of the present invention will address the possibility or need for traffic control under remote control in a moving work zone. The concept of a moving versus a static work zone will be understood to those skilled in the art of road construction, maintenance, and other applications such as emergency services and the like requiring a moving work zone. Where the work zone on a road surface would typically comprise a length of the road surface within which road work or emergency services were being conducted, the work zone could be static or moving. The work zone typically has a beginning and an end. The beginning of the work zone is where traffic control is usually first required—for example to provide an indication requiring traffic to stop or slow as they approach workers or the like. As vehicles move through the work zone there might be additional signage, or in the case of a long work zone, additional traffic flagging positions might be used. The end of the work zone is where regular traffic flow is resumed.

If the road surface on which the work zone is located is a one way road, the beginning of the work zone might be the only place that traffic flagging or control is required. In other cases, where the road surface comprises two way traffic flow, it might be necessary to have traffic flagging or control at both ends of the work zone to control the speed and entry or egress of vehicular traffic into and from the work zone.

Figure 1A:
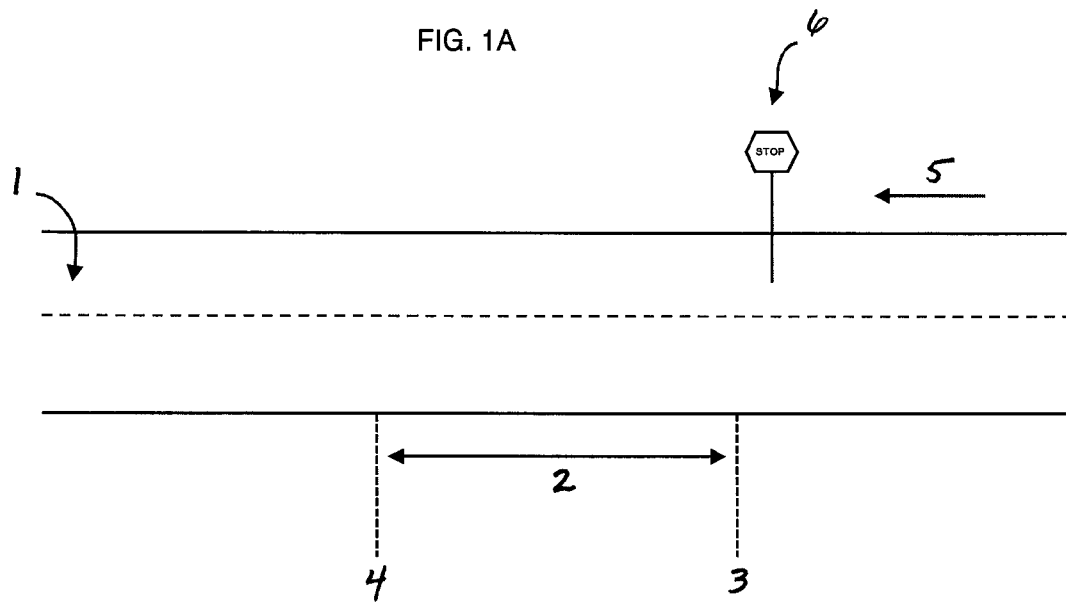
FIG. 1A is a schematic drawing demonstrating a static work zone on a road surface.

A static work zone is a work zone which, once established, does not change in size or location—for example, a work crew might set up their signage and equipment to excavate and or service a pipeline or duct that crosses, or is in proximity to, a road, or patch a particular hole or portion of the road surface or the like. FIG. 1A is a drawing of a static work zone on a one way portion of road—there is shown a road surface 1 with a work zone 2 defined thereon. The work zone 2 has a beginning or entry point 3, and an end 4. The arrow 5 shows the direction of vehicular travel. There is a traffic control position 6 in proximity to the beginning 3 of the work zone 2. The traffic control position 6 is where traffic control or flag people would conventionally be used. There might be additional traffic control positions 6 through the work zone 2, for example in a longer work zone 2 where it was desired to provide reminders of traffic speed and other requirements to vehicles passing therethrough.

Figure 1B:
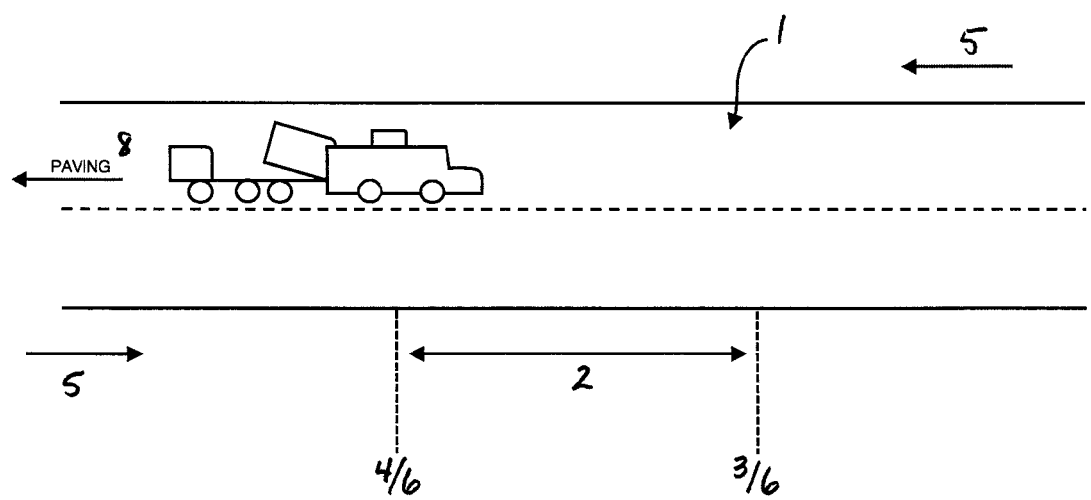
FIG. 1B is a schematic drawing demonstrating a moving work zone on a road surface.

FIG. 1B is intended to assist in enabling the concept of a moving work zone, in the context of the present invention. Where the static work zone 2 shown in FIG. 1A would not move in size or location while the work requiring traffic control was completed, other cases where the size of the work zone 2 might expand or contract, or might move as during traveling work such as paving, sealing or the like, also require traffic control. Referring to FIG. 1B there is shown the road surface 1 and the starting position of the work zone 2 is also shown thereon. The work zone 2 again has a beginning point 3 and an end point 4 as shown—although as can be seen with the aid of the traffic flow arrow 5 in this particular case a two way road surface is shown for demonstrative purposes. A road paving operation, which would potentially move along the road surface through the course of a day or working session, is shown for the purpose of demonstration. As the work was completed, and the operation moved in the direction 8 shown, it would be necessary to move the work zone 2 along the road surface in this direction, such that the traffic control positions 6 would need to be moved during the course of the work period. The present invention is capable of efficient and high-safety use in both static and moving work zones, to allow for cost efficiency in operations as well as maximizing traffic control safety by removing the need for traffic control personnel to work in the oncoming traffic at either the beginning or end of the work zone.

PRIOR ART

Figure 2:
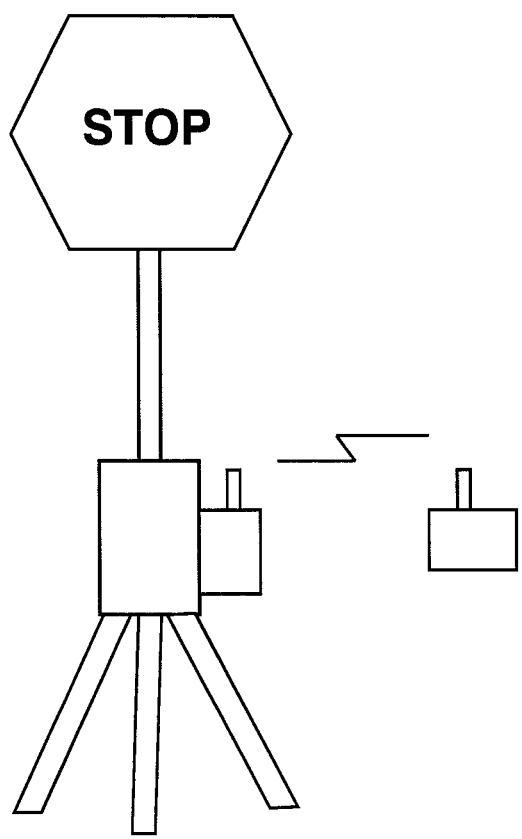
FIG. 2 demonstrates a prior art traffic flagging apparatus, for use in static work zones.

From the perspective of prior attempts at addressing similar issues, we refer to the prior art apparatus of U.S. Pat. No. 6,104,313, which discloses a traffic control indicator which is attached to a stationary tripod or similar platform and which can be remote controlled in terms of the indication displayed to oncoming traffic by rotation of a vertically oriented shaft with a typical traffic control sign/paddle indicator on the top thereof. FIG. 2 of the present application demonstrates one embodiment of this prior art device for the purpose of demonstrating the earlier state of the art, and by comparison, distinguishing the patentable invention outlined herein.

The prior art device shown in FIG. 2 features a tripod or similar stand with a rotatable vertically oriented shaft thereon, which has a typical paddle type sign at the top thereof. Two different traffic indications are covered, by having a different text-based sign content for viewing by oncoming drivers on either side of the sign, and the traffic control by this apparatus is effected by rotating the vertical shaft to show one or the other traffic indication to oncoming traffic—for example the sign might have a STOP message on one side thereof and a CAUTION/SLOW message on the other side. A remotely located human operator, by triggering a remote control, can cause this unit to actuate a motor to rotate the vertical shaft and change the traffic-facing message or indication. The tripod is positioned in place on the road or work surface, and is either connected to or integrated with the actuation hardware, power supply system and necessary electronics to trigger the rotation of the shaft/paddle as required by the remote operator.

The prior art apparatus of FIG. 2 would only be useful in a static work zone as it cannot easily be moved on the work surface other than by disassembly or movement by human operators. This would take time, requiring the temporary shutdown of the work zone or implementation of human-performed traffic flagging while the unit is moved. Human flag personnel or other members of the working crew are required to disassemble, move and reassemble the unit if the work zone is to be moved down the road surface, thereby exposing such personnel to potentially hazardous traffic situations, which is the primary problem sought to be avoided with the present invention.

This prior art apparatus was more intended to deal with the elimination of one of two flag people conventionally present at a two ended static work zone—such as a static work zone on a two lane road requiring closure of one lane and the use of the second lane unidirectionally for periods of time to move traffic through the work zone. The intended purpose or utility of this prior art device is thus different from at least some contexts in which the present invention proves notably useful, and the fact that the presently disclosed apparatuses can be moved under power and by remote control, rather than by human locomotion, is a safety enhancement. Disclosed embodiments of the present invention also provide streamlined implementation of power-assisted remote control traffic indication or flagging technology in applications requiring the ability to move the work zone during the work period.

Mobile Traffic Control Apparatus:

The remote control mobile traffic control apparatuses of the present invention represent a multi-faceted enhancement over the prior art. Not only does the remote control traffic apparatus of the present invention allow for the remote actuation of changes in the traffic control indication displayed to oncoming traffic by a traffic control indicator, it also allows for the movement of the traffic control device during operation or without disassembly, unlike prior art methods and equipment. This allows for better operator safety while also enhancing the economic safety of the traffic control aspect of the road work or safety work in question, since work does not need to be stopped to move the traffic control equipment as the work zone is moved along the work surface, such as the road or the like.

Figure 3:
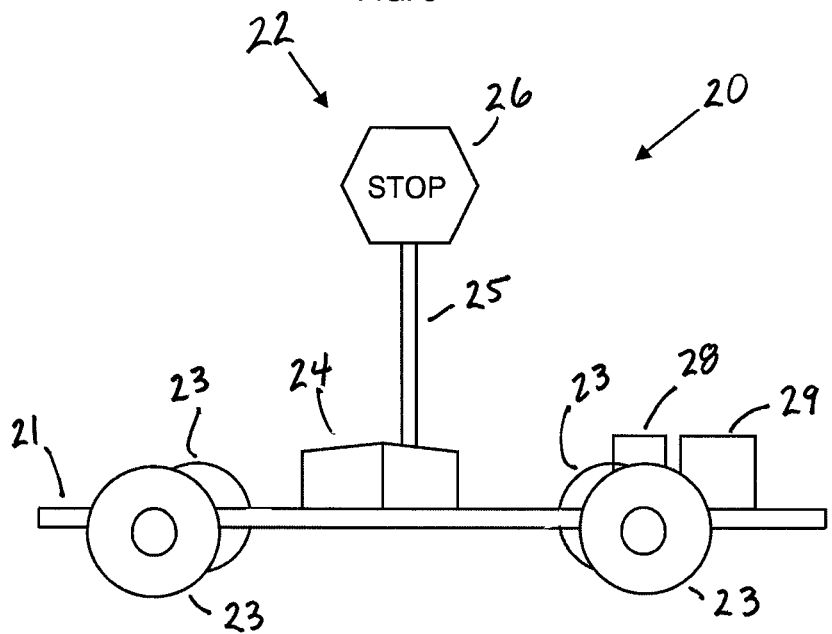
FIG. 3 is a perspective view of one embodiment of a remote controlled mobile traffic control apparatus of the present invention.
Figure 4:
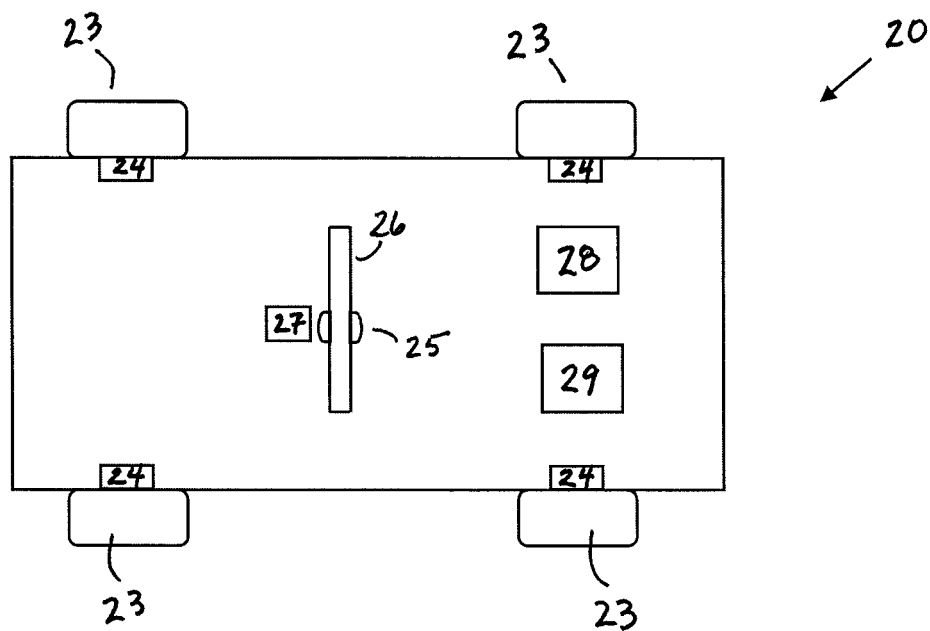
FIG. 4 is a top view of the embodiment of FIG. 3.

FIG. 3 schematically illustrates a remote controlled mobile traffic control apparatus according to one embodiment of the present invention. The remote controlled mobile traffic apparatus 20 comprises a mobile platform 21 with a traffic control indicator 22 mounted thereon. The mobile platform 21 includes a locomotion or drive system featuring wheels 23 or tracks or the like, which are capable of moving the platform 21 when powered or actuated. The wheels 23 might include one or more separately attached and controlled positioning motors 24, capable of moving and steering the platform 21 as required. In other words, this embodiment features four independently driven wheels arranged in two pairs on opposing sides of the platform and each having a dedicated wheel motor operable to drive rotation of that specific wheel independently of the other wheels. This way, synchronous driving of all wheel motors can be used to drive the mobile platform forwardly and rearwardly on a straight path, while differential driving of the wheels on opposing sides of the platform 21 can be used to effect turning of the mobile platform. Alternatively, axles joining the wheels together in opposing pairs across the platform may be used with traditional steering hardware without departing from the scope of the invention, in which case a singular motor driving at least one pair of opposing wheels via axle connections may be employed. Whether a singular motor driving multiple wheels or multiple wheel motors driving individual wheels are used, the term positioning motor is used herein to denote a motor operable to drive one or more of the ground engagement members (e.g. tracks, wheels, etc.) and thereby convey the mobile platform over the ground for the purpose of "positioning" the mobile platform.

The traffic indicator 22 in the first embodiment is a rotatable vertically oriented sign such as those traditionally used for flagging applications, but could alternatively or additionally comprise other types of traffic control indicators or signs which might also be useful in certain applications. In the case of the vertically oriented sign of the first embodiment, the indicator 22 comprises a shaft 25 vertically and rotatably attached to the platform 21 such that when rotated around its longitudinal axis, the shaft 25 can rotate and alter the sign indication that faces oncoming traffic on a respective side of the sign 26 attached at the top end of the shaft. The sign 26 might be a two-sided paddle type sign, or could include more than two faces to allow for the display of more than two traffic control indications to oncoming traffic. In the case of the first embodiment, each traffic control indication is a printed message, with a printed STOP message on one side of the sign and a printed SLOW or CAUTION message on the opposing side.

In such an embodiment, the indicator 22 also includes a sign motor 27 or other actuation hardware responsible for actually rotating the shaft 25 as required to adjust the traffic control indication displayed to oncoming traffic.

A power supply 28, such as battery or generator, is also included on the platform 21, and is capable of powering the positioning motors 24 and the sign motor 27 as required in order to move and steer the platform 21 and rotate the shaft 25 to adjust the traffic control indication as desired by the operator. Many different types of power supplies 28 could be used that would all accomplish the required objective of powering the apparatus 20 as required, and all such power supplies are contemplated within the scope hereof. In the case of a battery used to power DC wheel and sign motors, solar panels or a generator may be included as part of a charging system to maintain or return the battery to a sufficiently charged level for ongoing use of the apparatus without connection to an external recharging source. Additionally or alternatively, a battery charger with a power cord connectable to mains power (e.g. 110 VAC) or an external generator may be included onboard for charging of the battery by mains power during downtime at a storage location for the apparatus, or by an on-site generator at the work zone.

Figure 5:
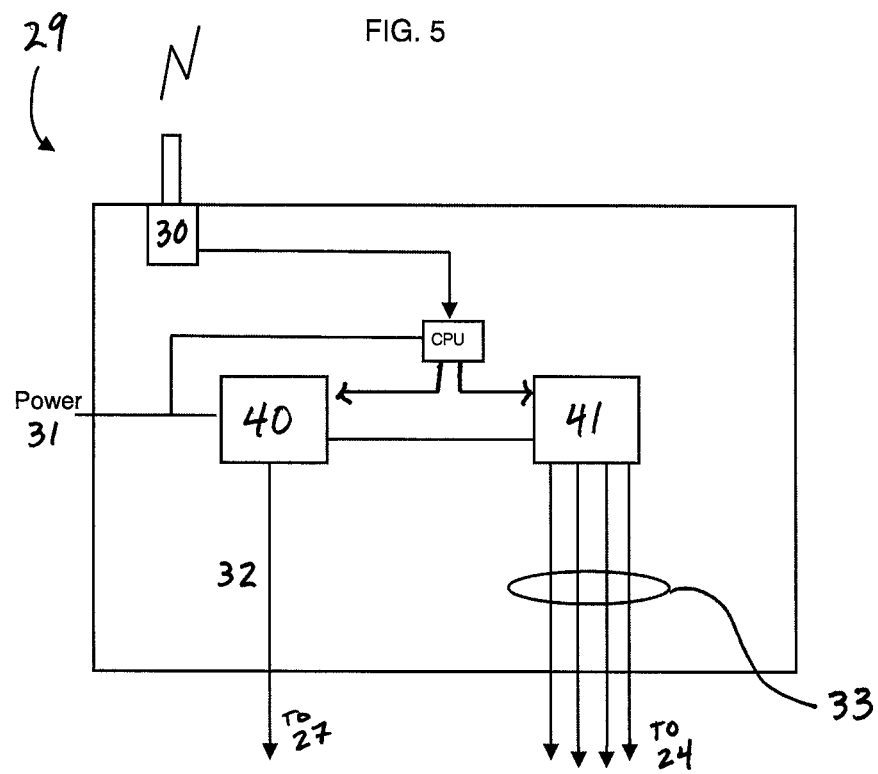
FIG. 5 is a block view of components of the control system module of the FIG. 3 embodiment.

The apparatus 20 also includes a control system module 29. FIG. 5 is a block diagram of the various components of the control system module 29 of the present embodiment. The control system module 29 comprises a control transceiver 30, e.g. a wireless network interface by which the transceiver 30 can send and receive signals to and from a wireless remote control used by an operator to control the traffic control indication and the positioning of the platform 21. While a transceiver is described to enable transmission of outgoing signals from control module 29, a receiver lacking a corresponding transmission function may be employed if such outgoing signals are not required, while still allowing receipt of incoming signals for remote control of the apparatus.

The control system module also includes a connection to a power bus 31 on the system 20, for the purpose of powering the control system module 29 and its components, as well as powering the motors 24 and 27, from the power supply 28. The motors 24 and 27 as well as any steering equipment on the platform 21 would also be connected to the control system module 29, either via a unitary control bus or via separate control connections via which the control module 29 could actuate the necessary motors 24 and 27 and/or steering equipment as required to adjust the traffic control indication and/or the location of the platform 21. A traffic indication control connection 32 is shown, via which the control module 29 is connected to the sign motor 27, and four positioning control connections 33 are also shown, which would connect each positioning motor 24 to the control module 29.

The motors 24 and 27 may be directly powered via the power bus 31 and receive only control commands from the control module 29 via their control connections, or in other embodiments the control connection of the control module 29 to the motors 24 and 27 may each comprise line voltage power connections to the motors, whereby the control module 29 would directly power each motor. Both such approaches are contemplated within the scope of the present invention.

The control system module 29 also includes a traffic indication circuit 40 which, upon receipt via the transceiver 30 of an indicator control signal containing a remote control command from a wireless remote control, causes the alteration or setting of the traffic control indication presently shown to oncoming traffic by the apparatus 20. In the case of the instant embodiment with the rotatable paddle sign, receipt of this indicator control signal actuates the sign motor 27 via the traffic indication control connection 31 to rotate the shaft 25 and the attached sign 26 into the appropriate orientation to display the desired traffic control indication on the traffic-facing face of the sign 26, i.e. the side of the sign facing into oncoming traffic approaching the apparatus 20.

In addition to the traffic indication circuit 40, the control system module 29 also includes a positioning circuit 41 which, upon receipt of drive control signals containing remote control positioning or drive commands from the wireless remote control via the transceiver 30, causes the movement of the platform 21 in a particular direction on the work surface by activating the appropriate positioning motors 24 via the respective positioning motor control connections 33 (and any steering hardware if differential steering is not used) as required to effect the desired movement of the platform 21. Basically, using the wireless remote control, the operator of the remote control can communicate with the drive or locomotion system on the platform 21 and effect the movement of the platform 21 between working positions without the need for the human operator to enter the oncoming traffic danger zone, and without the need to disassemble the traffic control unit for movement between working positions or within a moving work zone, which minimizes downtime.

The control module 29 includes the additional necessary circuitry, and any software instructions stored on a non-transitory computer readable memory of the control module for execution by a processor thereof, as required to interpret any remote control commands received via the control transceiver 30 from the incoming signals from the remote control and interpret same into the appropriate action commands to be delivered to the sign motor 27, the positioning motors 24 and any steering hardware as required to effect the operator-desired movement or activation thereof.

Remote Control:

The wireless remote control 34 provides positioning and traffic indication commands to the control module 29 via wireless signals transmitted thereto, which results in the actuation of the necessary motors and circuitry thereon to achieve the desired traffic control effect.

Figure 6:
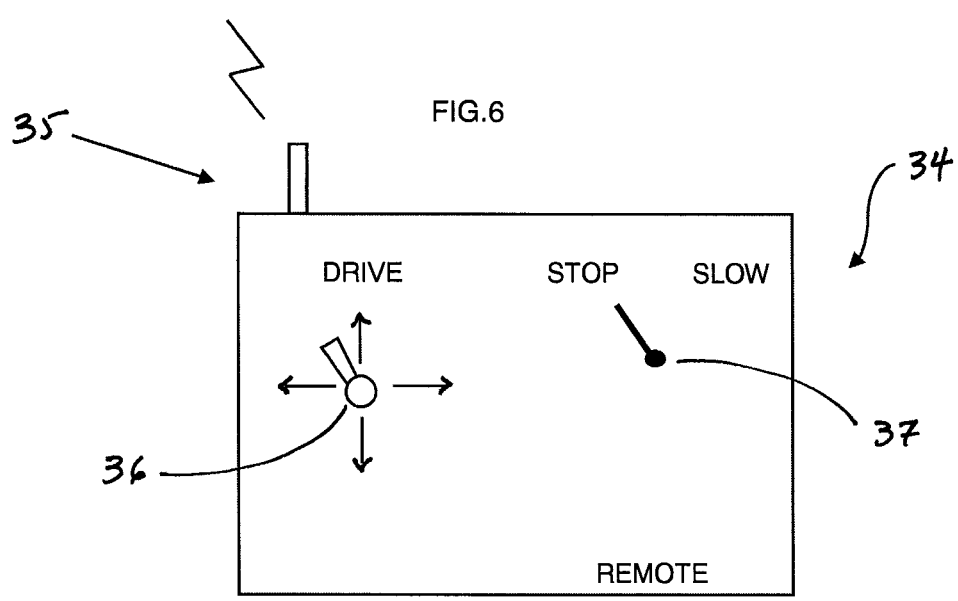
FIG. 6 is a perspective view of one embodiment of a wireless remote control useful with the FIG. 3 apparatus.

FIG. 6 is a schematic plan view of one wireless remote control which could be used in accordance with the first embodiment of the traffic control apparatus. Wireless remote controls and the required circuitry for same is understood to those skilled in the art, and any wireless remote control hardware capable of dispatching signals with the necessary command instructions to the control module 29 on the mobile platform 21 will be understood to be within the scope of the present invention. The wireless remote control 34 will typically comprise a casing within which a battery or other power source is included, along with the necessary circuitry for the remote control. The remote control circuitry will typically include a wireless transmitter or transceiver 35 which will, upon activation of switches or other manual inputs on the remote control 34, transmit a control signal via the transceiver 35 to the paired transceiver 30 of the control module 29, which will upon receipt of such a control signal parse that signal to identify and perform the appropriate command.

In the embodiment of FIG. 6, the manual inputs comprise a joystick control 36 for the ground-conveyed movement of the platform 21, as well as a finger switch 37 (e.g. toggle or slide switch) or the like to control the traffic control indication. The operator of the remote control 34 can change the traffic control indication being shown to oncoming traffic by switching the finger switch 37 to the desired indication (e.g. STOP or SLOW/CAUTION), which transmits an indicator command signal via the transceiver or transmitter 35 to the related transceiver 30 in the control module 29 on the mobile platform, which would result in the activation of the sign motor 27 and the rotation of the shaft 25 to show the desired indication of the sign 26 to oncoming traffic. Since the operator would typically be operating the system from within a line of sight of the platform-carried system components, as well within sight of the work zone and oncoming traffic, the operator can simply flip the switch 37 into the correct indication mode at any time, resulting in the appropriate adjustment of the traffic control indication shown to the oncoming traffic by the sign 26. In more elaborate embodiments of the system of the present invention including a transceiver in the control module 29 to enable transmission of signals therefrom, upon adjustment of the indication of the sign 26 via the remote control, the control module 29 can provide feedback or transmit back a confirmatory indication signal back to the remote control 34, which could provide a visual, audible or other feedback to the operator confirming for them that the sign has entered the correct indication mode. As well, as outlined below, certain embodiments of the present invention could include a remote control with remote video capability so that the remote control could be used out of visual sight of the control platform and still allow for the operator to see the surroundings of the platform and operate the unit safely.

In addition to the ability to wirelessly adjust the traffic control indication of the sign 26, the remote control 34 also effectively provides the ability for the operator to drive the mobile platform 21 to a new working location at any time, so that it could be moved with or within the work zone, without the need to disassemble and reassemble the apparatus. In the embodiment shown in FIG. 6, the joystick 36 can be used to control the positioning of the mobile platform 21, by way of the transmission of drive control signals related to the operator's movements of the joystick 36 to the control module 29, where the signals are interpreted into control commands to be provided via the positioning motor control connections to the various positioning motors or steering hardware on the device. This allows for driving of the mobile platform between working locations without the need to either have the operator enter the traffic area directly, or to shut down the operation of the traffic control platform for any extended period of time during disassembly and movement thereof.

Again, as mentioned above, there could be many more basic or more elaborate remote control embodiments useful for the operation of a traffic control apparatus similar to that outlined herein, and any remote control which is capable of being used within the overarching method of the present invention, that is to say to provide wireless remote control signals allowing for the adjustment of visible traffic control indications shown to oncoming traffic as well as to allow for the driving or movement of the mobile platform of the traffic control apparatus between working locations with or within a work zone, are contemplated within the scope of the present invention.

It is specifically contemplated that rather than purpose built remote control hardware, the wireless remote control 34 could also be a laptop computer, smart phone or tablet device or the like with an appropriate software app installed thereon, and the related control components on the remainder of the system could be modified to communicate and receive control signals from such a hardware device. As well, if the traffic control platform itself included a changeable electronic sign board, instead of a rotating sign with different fixed messages on different sides thereof, the remote control 34 could also control or adjust the sign indication messages displayed on same.

As well, the remote control 34 might also include, either in the case of a purpose built or pre-programmed hardware controller or a general purpose computer, phone, tablet device etc. with appropriate software thereon, a display monitor wirelessly connected to a camera on the traffic control platform may be included as part of the remote control, such that the operator could operate the unit from outside of a direct sight line. Again this modification will be understood to those skilled in the art of similar systems design and is contemplated within the scope hereof.

Traffic Control System:

In addition to the remote control mobile traffic control apparatus 20 disclosed herein, as well as a remote control 34 as outlined, the present invention also comprises the system for traffic control which includes both the remote control mobile traffic control apparatus 20 as well as the remote control 34 for use in the wireless remote control thereof. Any system which comprises a remote controlled mobile traffic control indicator platform capable of movement under wireless remote control instruction between working locations, as well as capable of providing multiple traffic control indications to oncoming traffic, as well as a remote control unit itself capable of providing the necessary remote control instructions for the movement of the traffic control indicator platform and the traffic control indicator thereon, will be understood to be within the scope intended of the present invention.

Figure 7:
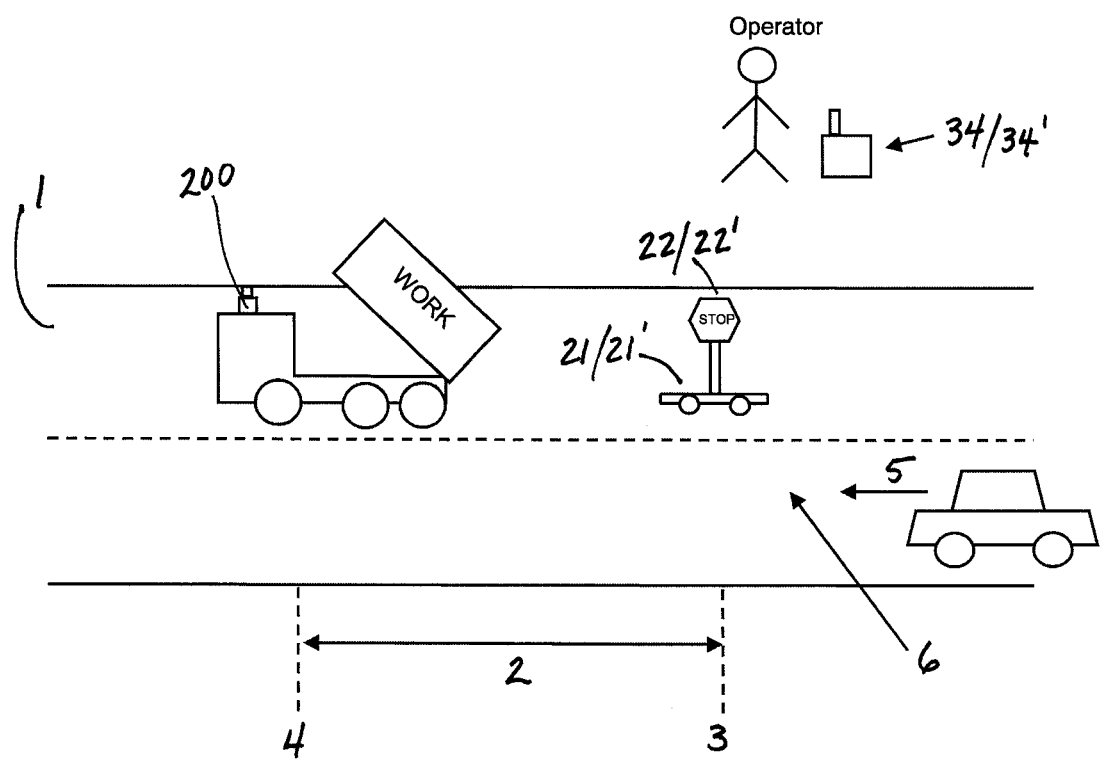
FIG. 7 is a schematic view demonstrating positioning and use within a work zone of a traffic control system featuring the apparatus of FIG. 3 and remote of FIG. 6.

FIG. 7 demonstrates the components of one embodiment of a system in accordance with the present invention, within a work zone.

Method:

In addition to the specific hardware/apparatus/system embodiments outlined herein above, there is also disclosed a novel method for traffic control in a work zone using a wirelessly remote controlled mobile traffic control apparatus comprising a motorized platform capable of responding to wireless remote control movement instructions, and a wirelessly adjustable traffic control indicator thereon. An operator within visual sight of the apparatus can use a wireless remote control to change the traffic control indication provided to oncoming traffic dependent upon operating circumstances, as well as to move the motorized platform between working locations within the work zone without the need to physically attend to the platform itself.

Figure 8:
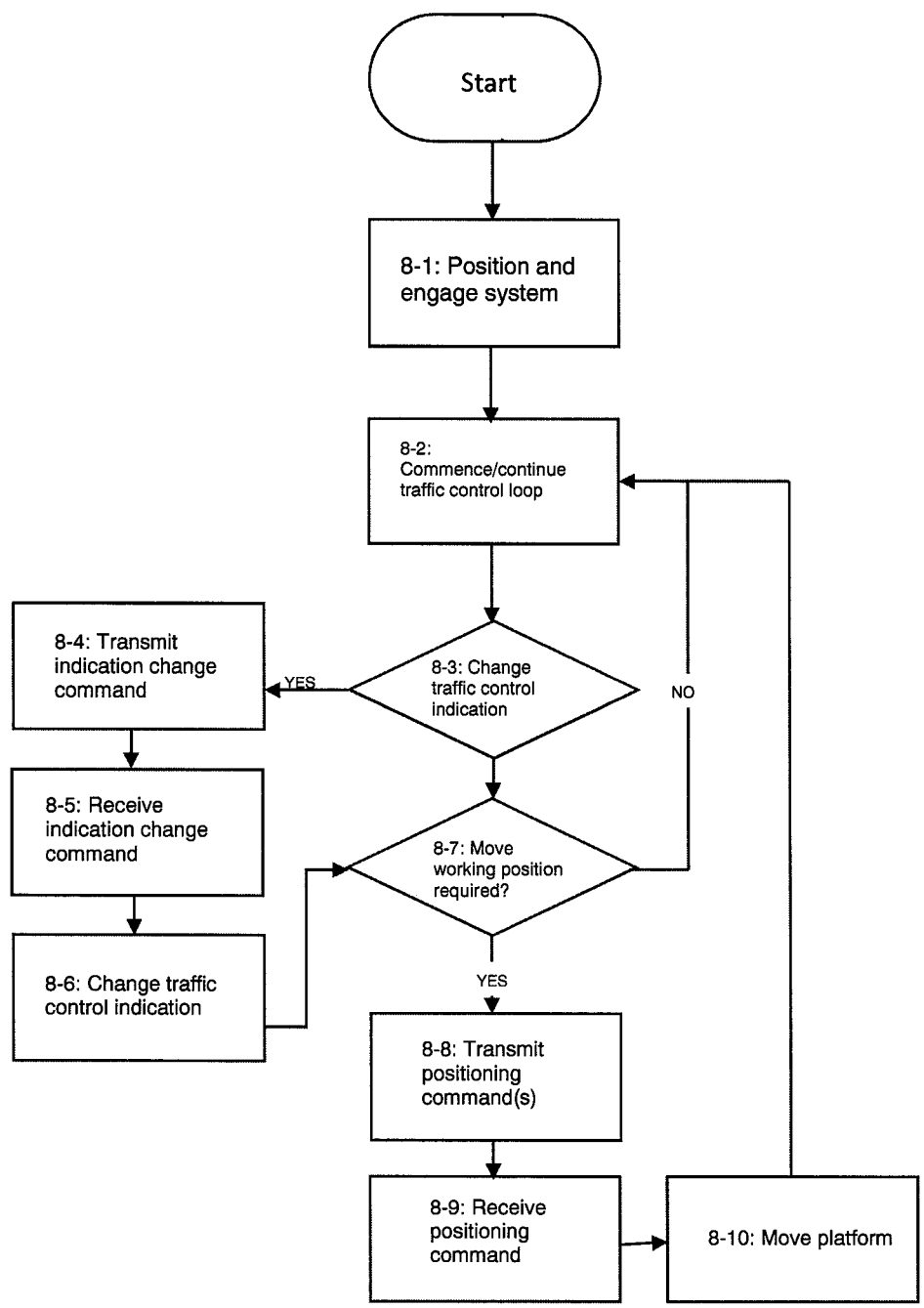
FIG. 8 is a flowchart showing the steps of one embodiment of a traffic control method of the present invention.

FIG. 8 is a flow chart demonstrating the steps of one embodiment of the method of the present invention. Effectively, the method comprises positioning a remote controllable mobile traffic control platform with a remotely actuated traffic indication thereon within or in proximity to a traffic control required work zone, and then changing traffic control indication shown to oncoming traffic and moving the traffic control platform in response to remote control signals received from a remote control operated by an operator, within a traffic control loop.

The first step of the method is shown at step 8-1, being the manoeuvring into position of a remote controlled mobile traffic control platform as outlined herein. A platform 21 as outlined elsewhere herein is manoeuvred into position either on or in proximity to the road surface where oncoming traffic would address the traffic-facing side of the sign thereon, or other traffic indication thereon. Typically this would be placed in proximity to the beginning of the work zone, although it could be placed in another position as well. The platform would be manoeuvred into position at or adjacent the road surface, for example by remote control of the locomotion or drive system from a safe remote location off to the side of the road, and the correct traffic control indication to be shown to oncoming traffic would be set, and the traffic control loop could then be engaged. The traffic control loop, which is shown at step 8-2 and onwards in this flowchart, comprises an operator monitoring the traffic control requirements at the work zone and remotely setting the appropriate traffic control indication for display to oncoming traffic using the remote control. From time to time, as movement of the platform in relation to the work zone is required, the operator will initiate the necessary remote control positioning commands to result in the movement of the platform.

Upon commencement of the traffic control loop, shown at Step 8-2, the first decision block, shown at 8-3, is for the operator to decide whether or not a traffic control indication change is required—i.e. is it appropriate based on the work zone circumstances to change the sign which is shown to the oncoming traffic (for example, changing the sign from SLOW to STOP, or vice versa, or changing to any other one of the indications available as options on the sign and platform). If a change of traffic control indication is determined to be necessary, the operator using the remote control would transmit a wireless control signal with an indication change command to the control module and the platform— as shown at Step 8-4. On receipt of an indication change command, the mobile platform and its control hardware and traffic indicator would change the traffic control indication shown to oncoming traffic—the reception and execution of the indication change command being shown at Steps 8-5 and 8-6.

Returning to the remainder of the traffic control loop either after an indication change or in the absence of a requirement to do so, the second decision block shown at 8-7 is an operator determination of whether or not it is desirable or required to move the working position of the mobile platform 21 and attached components. If no relocation of the working position is required, the monitoring loop continues, back to Step 8-2. If a move of the working position of the traffic control apparatus is required, the operator will transmit, shown at 8-8, wireless control signals containing positioning commands from the remote control to the platform apparatus, which will on receipt thereof shown at 8-9, cause the actuation of the drive/locomotion system on the device to move the traffic control apparatus to a new working position.

It will be understood that the method shown in FIG. 8 is only one basic embodiment of a traffic control and monitoring method within the scope of the present invention, and that many modifications including changes in the ordering of the steps therein could be made without departing from the scope and intention thereof. For example, the traffic control loop might change the order of the two decision blocks such that the movement of the working position of the platform apparatus was determined first in the loop before the requirement for a change in traffic control indication. These changes and others will be obvious to those skilled in the art of relevant system design, and all such modifications are contemplated within the scope of the present invention in so far as they do not depart from the overall intention hereof, which is to effectively provide system, method and apparatus for the wireless remote control of a movable and adjustable traffic control indication apparatus in a work zone.

Attention is hereby paid to a couple of specific traffic control scenarios which lend themselves very specifically to the use of the remote controlled mobile traffic control system of the present invention. The first of these is in a traffic control scenario where there is a long lineup of traffic being controlled by a flag person or traffic flagging station at the front of the lineup. As the length of the vehicle line-up extends with the increase in individual vehicle length and/or quantity of individual vehicles in the line, the visibility of the traffic control signage or traffic control indications at the front of the line become less and less visible to vehicles at the back of the line. By providing a mobile traffic control platform that can be driven towards the rear of the traffic line up during the control of this traffic scenario, it allows for vehicles towards the rear of the traffic line up to still see at a safe visibility level the signage in question. While the mobile traffic control apparatus moves up-road along the traffic line-up to convey the traffic control indication message to the lined up vehicles and thereby apprise these vehicles of the upcoming work zone, another mobile traffic control platform could be allowed to remain stationary at the front of the lineup or within a mobile work zone. Alternatively, a stationary traffic control sign or even a flag person could be used at the front of the traffic line up in the event that only one mobile apparatus is available.

Another benefit of the mobile remote controlled traffic control platform of the present invention would be that in a certain circumstance where a vehicle were coming into a work zone at an unsafe speed or in an unauthorized manner where it was not safe to do so, the mobile platform could be driven in front of the vehicle to present a stop-inducing crash hazard to the vehicle. That is to say, the platform could be sacrificed to stop the safety risk to the workers within the work zone due to the unsafe entry of the vehicle thereto.

Traffic Platform Locomotion Options:

As outlined above there are numerous types of approaches to the mechanization of the mobile platform 21, all of which are contemplated within the scope of the present invention. The platform 21 might have three or more wheels thereon, capable of supporting and rolling the platform between working locations. Alternatively, as little as two wheels may be employed with suitable electronic balancing function, as used in commercially self-balancing scooters or "hoverboards". In other embodiments, tracks can be used, such as are used on a bulldozer or other similar device. Any type of an interface between the platform and the ground surface (e.g. road surface or other working surface) which provides for movement between working locations, and the steering of the device as it is moved between working locations, are contemplated within the scope hereof. Gyroscopic steer assist systems for maintaining a straight line path of the mobile platform during non-turning conveyance thereof regardless of terrain variations may be used, including but not limited to Spektrum™ Active Vehicle Control® (AVC®) by Horizon Hobby, LLC and autonomous vehicle control solutions available from D-BOX Technologies Inc.

As mentioned above, where wheels were used on the platform 21, each wheel could be motorized and separately controllable such that by adjusting the speed of movement or direction of movement of individual wheels, the steering and movement in a particular direction of the platform 21 could be affected. Alternatively if tracks were used in the place of wheels, those skilled in the art of track locomotion systems would understand the creation of a motor drive which was again capable of movement of the platform 21 and steering thereof. There may be other embodiments in which some but not all of the wheels were motorized—i.e. trailing wheels—allowing for locomotion and steering of the unit without the need to motorize all wheels of the platform. One such further embodiment is specifically detailed herein further below, though again without limiting the present invention to the specifically disclosed example.

In certain cases where wheels were used, axles might extend between the wheels instead of relying on independent rotatable attachment of each wheel at a particular point on the chassis or platform 21. Where axles are used, or otherwise, instead of steering the movement of the platform 21 by adjusting the direction or speed of movement of individual motors, conventional steering hardware might also be added. Any combination of ground engaging interface and rotatable attachment to the platform 21 combined with a power system and requisite steering hardware and a control interface therefore, which will allow for the controllable movement of the mobile platform 21 between working positions within a work zone, will be understood to be within the scope of the present invention. Accordingly, wheels and tracks are not the only examples of ground engagement members of the drive system that are useful to support and convey the platform over the ground surface, but other possibilities are also contemplated, for example including the combination of one or more tracks with one or more skis, e.g. as commonly used for snowmobiles.

Traffic Indication Options:

It will be understood that there are many different types of traffic indication hardware that can be used in accordance with the system and apparatus of the present invention. The rotatable paddle type sign, such as is demonstrated both in the prior art embodiment of FIG. 2 as well as the presently disclosed embodiment of FIG. 3, is just one example of a traffic indication apparatus that may be used, since this type of a rotatable paddle type sign is the type of a sign which is conventionally used by human flag persons in traffic control applications. One potential benefit is that this type of traffic sign is, at least in many North American applications, well known and understood by drivers. Potential disadvantages of text-based signage include language barriers, literacy barriers and misinterpretation of the stop message. Without a human flag person standing beside the printed sign, some motorists will treat the signage like a conventional STOP sign, thus stopping only momentarily and then proceeding onward if it appears safe to do so. Other embodiments employing light-based traffic control indications are contemplated herein further below to address such shortcomings and provide more universally recognizable messaging to drivers.

It will be understood however that other types of traffic indication apparatus could be used in the place of the rotatable shaft and sign, including a signboard with indicator lights, a traffic light or the like. The necessary modifications to the control module 29 of the remainder of the apparatus will be understood by those skilled in the art of the design of this type of equipment and all such modifications are contemplated within the scope of the present invention in so far as they do not depart from the overall understood invention which is to provide a remotely controlled mobile platform with an adjustable traffic control indicator thereon, which can be used in traffic control applications. One such further embodiment using a traffic light as its indicator is specifically detailed herein further below, though again without limiting the present invention to the specifically disclosed example.

Remote Control Options:

It is specifically contemplated that the remote control of the traffic control apparatus of the present invention is a wireless remote control, thus the outline herein of options around the configuration of a remote control and a wireless transceiver. The use of a wireless remote control provides the most safety from the perspective that cables or the like would not be required and would not be a safety hazard (e.g. tripping hazard) in the work zone. It is specifically contemplated that the mobile platform and the remainder of the apparatus of the present invention would likely be controlled by an operator with a visual line of sight of the apparatus, but who would be out of the threat of oncoming traffic, i.e. off to the side of the road surface of the like. By operating the apparatus from within a visual line of sight thereof, the operator would be able to see the oncoming traffic and the happenings within the work zone such that they could properly set the traffic control indication on the apparatus. As outlined above however, remote control with remote video monitoring capability would also allow for control of the apparatus from out of visual proximity between operator and apparatus.

While it is contemplated that the remote control used with the remainder of the system of the present invention comprises a purpose built or specially programmed hardware remote control, it will be understood that another approach to the remote control aspect of the present invention would be to provide an app for remote control of the apparatus using a smart phone, tablet or other device, such that pre-existing hardware could be used, with the necessary communications modifications to the remainder of the system, in the place of purpose built remote or pre-programmed control hardware. Both such approaches are contemplated within the scope of the present invention.

Multiple Traffic Control Apparatus:

It will also be understood that the wireless remote control concept which is contemplated with respect to the control of the traffic control apparatus of the present invention could allow, if there was sufficient transmitting power on the remote control, for the adjustment by the remote control of the traffic indications on multiple traffic control apparatuses within the work zone. For example it may be the case that additional mobile or stationary traffic control apparatuses replace the different traffic control requiring positions within or near the work zone so to allow for the provision of additional visual traffic control indications to traffic within and near the work zone. So the same remote control used to control the primary traffic control apparatus at the entry into the work zone may also transmit additional command signals to additional apparatuses within or near the work zone to provide additional traffic control indications elsewhere. The necessary system, software and other apparatus modifications to effect this type of a multi-apparatus approach will be understood by those skilled in the art and will be understood to be contemplated within the scope of the present invention.

Power System Options:

As outlined elsewhere herein, there are multiple types of power systems and power buses which could be used on mobile platform of the present invention. It is primarily contemplated that the battery-based power system will be used, with one or more batteries placed upon or otherwise carried by the platform. Those batteries can either be rechargeable during down-time periods at the work site, e.g. by an onboard battery charging connectable to mains power (e.g. 110 VAC) or a portable generator, or rechargeable during operation by solar panels or the like. It will also be understood that dependent upon the power load and the operating parameters for the apparatus, it may be desirable to use a portable power generator or other type of power supply, either to charge the batteries or to directly power the apparatus. Any type of power system capable of delivering sufficient power to operate the circuitry and motors required for the remainder of the system and method to be practiced will be understood to be contemplated within the scope of the present invention. Further embodiments featuring battery-charging solar panels and using particular placement of one or more batteries to other advantageous effect are specifically detailed herein further below, though again without limiting the present invention to the specifically disclosed example.

Further Embodiments

FIGS. 9 through 16 illustrate another embodiment of the remote controlled mobile traffic control apparatus that once again comprises a mobile platform 21' with a traffic control indicator 22' mounted thereon, but uses a two-light traffic control indicator instead of a rotating paddle-type sign, and features the addition of a traffic barrier arm 50 movable into an out of a deployed position reaching into the path of oncoming traffic to form a physical barrier to unauthorized access to the work zone when the traffic control indicator is displaying its STOP indicator.

Adjacent a front end 21a of the mobile platform, this embodiment features a housing 52 carrying the power supply 28, the control system module 29, and a pair of positioning motors 24 respectively operable to drive a pair of drive wheels 23 that are situated laterally outboard of the housing 52 on opposing sides thereof. A frame of the mobile platform 21' features an elongated backbone or spine 54 formed by a length of rectangular metal tubing lying longitudinally of the mobile platform at a longitudinal mid-plane thereof that lies centrally between the two drive wheels 23. At the rear end 21b of the mobile platform, a singular non-powered caster wheel 23a is connected to the spine 54 adjacent the distal end thereof opposite the housing 52 and is free to swivel about an upright axis. The present embodiment thus employs a three-wheeled design in which straight line conveyance of the platform is performed by synchronous driving of the two drive wheels 23 by their respective positioning motors 24, and turning of the mobile platform is performed by differential driving of the two drive wheels by their respective positioning motors 24. The third castor wheel 23a lends stability to the mobile platform while cooperating with the differential drive to provide a minimal turning radius. This is generally referred to as a trailing-wheel configuration, where the platform would normally be driven in a forward direction, with its two drive wheels at the front end of the platform leading the trailing caster wheel and rear end in the mobile platform's direction of travel. While the illustrated embodiment uses wheels to movably carry the mobile platform and a differential drive for steering, other ground-engaging members may once again be used in place of wheels, including tracks, track and wheel combinations, wheel and ski combinations, and track and ski combinations, and other steering hardware may be employed within such options.

The two-light traffic control indicator 22' is carried atop a support shaft 25' that is mounted to the mobile platform 21' at the front end 21a thereof to stand upright therefrom. Unlike the rotatable shaft 25 of the earlier embodiment however, the shaft 25' is rotationally fixed to the mobile platform. Additionally, instead of a fixed-length shaft 25 like the earlier embodiment, the present embodiment features a telescopic shaft 25' with a lower shaft section 25a affixed to the mobile platform 21 and an upper shaft section 25b of smaller cross-section telescopically received in the lower shaft section 25a through the open upper end thereof. FIGS. 9 through 13 shows the telescopic shaft 25' in an extended state where the upper section 25b extends upwardly from the top end of the lower section 25a to carry the two-light traffic control indicator 22' at notable elevation well above the top end of the lower section 25a. A lock pin 56 is passed through aligned holes in the two shaft sections 25a, 25b to lock the telescopic shaft 25' in the extended position.

The two-light traffic control indicator is mounted atop the upper shaft section 25b, and features a solid red stop light 22a and a flashing yellow/amber caution light instead of the written STOP and SLOW/CAUTION indications of the written text paddle-sign of the earlier embodiment. In the illustrated embodiment, the lights are placed one over the other in a vertical layout with the red stop light situated above the yellow/amber caution light, but the particular layout may be varied within the scope of the present invention. By "solid" red light, it is meant than the red light is continuously illuminated in its ON state, whereas the yellow light intermittently flashes or pulses in its ON state. The control module 29' differs from the earlier embodiment in that its traffic indication circuit 40, instead of rotating a sign motor 27 into one of two predetermined positions showing a different side of a paddle sign, it instead activates a different respective one of the two indicator lights according to which indication mode is specified by the incoming indicator control signal from the remote control. To convey the commands to the light-based indicator 22', a cable may run upwardly alongside the shaft 25' from the control module 29 inside the housing 52. Alternatively, a wireless connection may be accomplished from the control module 29 to the traffic control indicator 22', for example using short wave wireless communication such as Bluetooth Behind the telescopic support shaft 25', a pair of stanchions 60 are mounted to the mobile platform one in front of the other, and stand upright from the topside of the housing 52 in order to pivotally support the traffic barrier arm 50 between them. A support seat 62 resides between the two stanchions 60 and is pivotally pinned between the stanchions 60 near the upper ends thereof. Further down the stanchions 60, a proximal end of an electric linear actuator 64 is likewise pivotally pinned between the two stanchions 60. The opposing distal end of the linear actuator 64 is pivotally pinned to the underside of the support seat 62 at a distance laterally outward from the two stanchions. Accordingly, extension and collapse of the linear actuator 64 respectively raises and lowers a working end 62a of the seat, which is situated on the side of the stanchions as the actuator 64. The barrier arm 50 is received within the hollow interior of the generally tubular support seat, which may be formed in two halves by two pieces of open-sided metal channel facing toward one another from atop and beneath the barrier arm, and then clamped tightly together with the barrier arm between them using U-bolts (not shown).

A proximal end 50a of the barrier arm 50 resides on a side of the stanchions opposite the actuator 64, and resides at or near the corresponding proximal end 62b of the seat. The majority of the barrier arm 50 projects beyond the opposing working end 62a of the seat so that when the seat 62 is in a working position lying perpendicular to the stanchions 60 and the support shaft 25', the barrier arm 50 is in a deployed position reaching laterally outward from the mobile carrier in a generally horizontal orientation parallel to the road surface at which the mobile platform is placed. A flag 70 is carried by the barrier arm near the distal end 50b thereof opposite the mobile platform in order to hang downwardly from the deployed barrier arm and increase the visibility thereof. The barrier arm features reflective material with alternating strips of contrasting colour (e.g. white and red) along its length, especially on the rear-facing side thereof, to also improve visibility, and may also feature LED lights or other illumination sources attached or built into the arm at spaced positions therealong to further increase visibility at night or in other visibly detrimental conditions (fog, haze, dust, etc.). Extension of the actuator 64 raises the working end 62a of the seat, thereby lifting the distal end 50b of the barrier arm 50 to raise the barrier arm into a retracted position standing more upright, and thus projecting less far outward from the mobile platform. Accordingly, when the traffic control indicator is in the STOP mode illuminating the red light, the barrier 50 is also deployed into its lowered position to obstruct oncoming traffic. The control module 29 may be configured to automatically lower the barrier arm into the deployed position in response to the stop-mode initiation command from the incoming remote control signal that activates the red stop light, and automatically raise the barrier arm into the retracted position upon receipt of a stop-mode termination command from the incoming remote control signal. Alternatively, the remote control and control module may be configured to use distinct barrier-control signals and commands that are separate from the indicator-control signals and commands.

Figure 14:
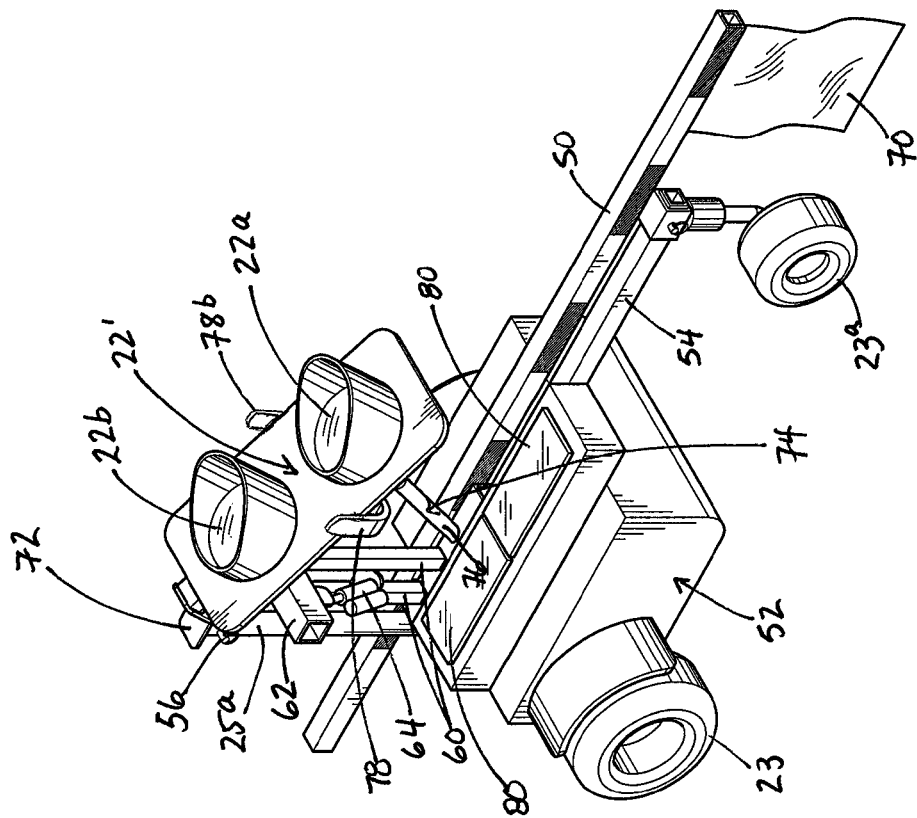
FIG. 14 is a rear perspective view of the apparatus of FIG. 9 in a collapsed state for storage and transport.
Figure 13:
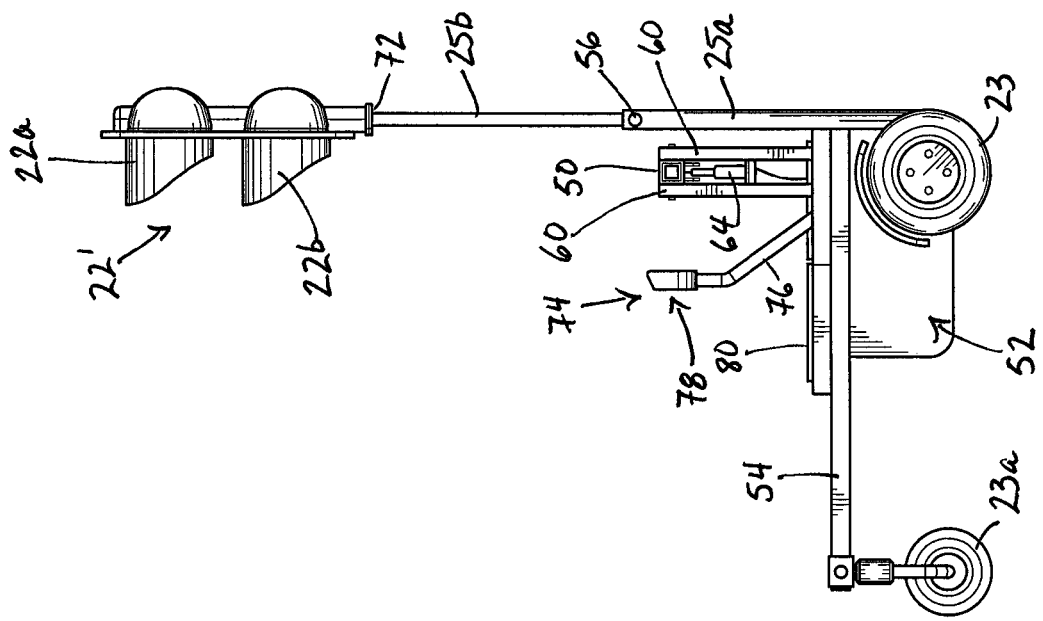
FIG. 13 is an opposing side view of the apparatus of FIG. 9.

Since the barrier arm 50 is removably mounted to the seat, and thereby removably from its pivotal support on the mobile platform 21', it can be removed therefrom for transport, as shown in FIG. 14 where the removed barrier arm is rested atop the housing 52 of the mobile platform in a position spanning longitudinally thereover. FIG. 14 also illustrates further collapse of the overall apparatus by collapse of the telescopic shaft 25' and tilting of the two-light traffic control indicator 22' into a stowed position. To achieve this, the traffic control indicator 22' is pivotally mounted to the upper section 25b of the telescopic shaft 25' by a hinge 72. The closed position of the hinge places the traffic control indicator 22' in its useful working position standing upright from the top shaft section 25b, as shown in FIGS. 9 through 13. However, opening of the hinge 72 tilts the traffic control indicator 22' rearwardly and downwardly from the top end of the upper shaft section 25b. FIG. 14 shows the upper shaft section being fully lowered so that the hinge 72 is situated directly on the top end of the lower shaft section 25a, and the upper shaft section 25b rotated 180-degrees relative to the lower shaft section to reverse the traffic control indicator's orientation so that the unlit side (i.e. the side thereof opposite the two lights 22a, 22b) of the traffic control indicator faces rearwardly. With the traffic control indicator reversed in this fashion and tilted downwardly about the hinge 72, the traffic control indicator 22 hangs downwardly along the lower shaft section and rearwardly over the barrier arm's support stanchions 60. Behind the stanchions 60, an auxiliary support 74 for the stowed traffic control indicator 22 features a base arm 76 angling upwardly and rearwardly from the topside of the mobile platform's housing 52, and a U-shaped cradle 78 carried atop the base arm 74 to receive the unlit side of the two-light traffic controller indicator 22'. The unlit side of the traffic controller indicator rests on the cross-bar 78a of the cradle between the two uprights 78b thereof. The cross-bar 78a may be padded with a sleeve or coating of foam or rubber to protect the traffic light housing of the traffic control indicator. FIG. 14 thus illustrates a collapsed transport/storage state of the apparatus where the lateral dimension of the apparatus is drastically reduced by removal of the barrier arm 50, and the height of the apparatus is drastically reduced by both collapse of the telescopic support shaft 25' and tilting of the traffic control indicator down to a reduced, elevation relative to its working position. Similarly, the barrier arm 50 may have a foldable hinged construction, or telescopic construction, along for storage and transport thereof in a more collapsed, space efficient state.

In another embodiment shown in FIGS. 24A and 24B, instead of a telescopically extendable and collapsible support shaft with a tiltable traffic control indicator mounted atop the upper shaft section, a foldable support shaft 25''' has its two sections 25a, 25b pivotally coupled together by hinge 72' to enable pivoting of the upper shaft section 25b between an extended position standing upward from the top end of the lower shaft section 25a, as shown in FIG. 24A, and a folded-over position tilted downwardly alongside the lower shaft section, as shown in FIG. 24B. This has the similar result of a downwardly tilted stowed position for the traffic control indicator behind the lower shaft section. A spring-assist may be coupled between the two shaft sections to provide a spring-force that aids the lifting of the foldable upper section into its extended position.

Figure 9:
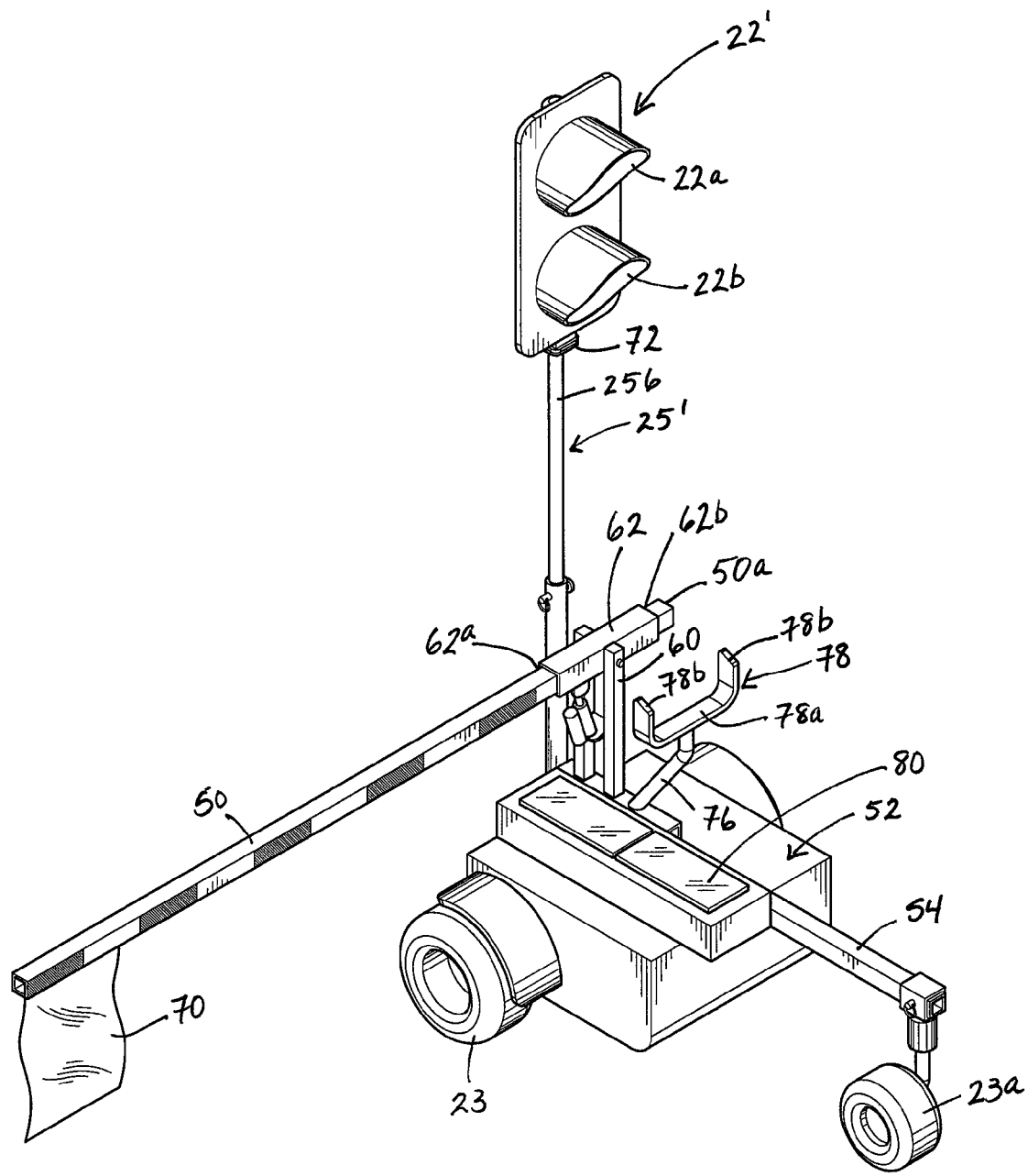
FIG. 9 is a rear perspective view of another embodiment of the remote controlled mobile traffic control apparatus of the present invention, and shows a traffic barrier arm thereof in a deployed position.
Figure 10:
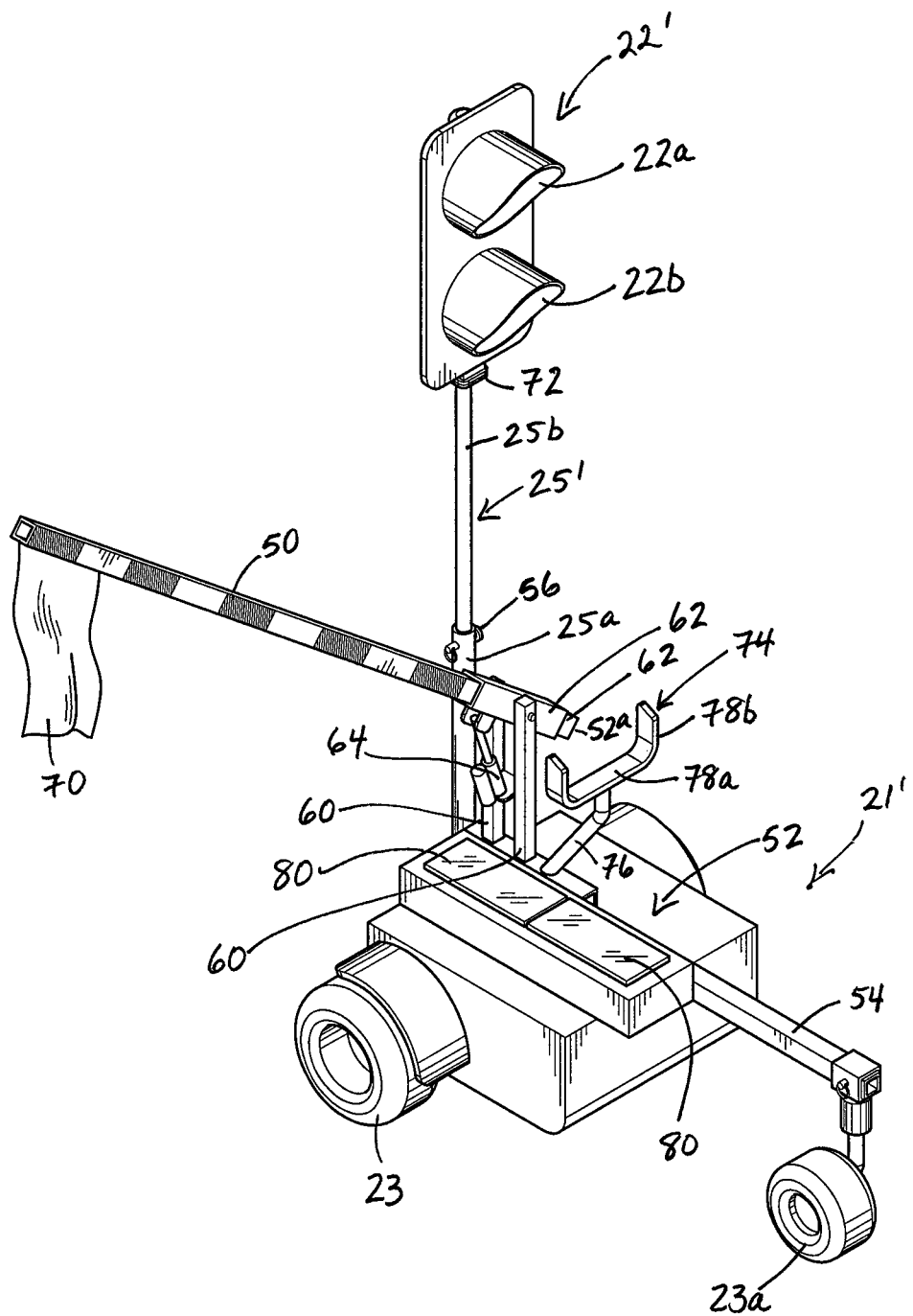
FIG. 10 is a rear perspective view of the apparatus of FIG. 9 with the traffic barrier arm thereof in a retracted position.

As can be seen in FIGS. 9 to 11, one or more solar panels 80 may be mounted atop the mobile platform 21'. In another example, one or more such panels may be mounted in overhanging positions cantilevered out to one side of the housing 52 over a respective one of the drive wheels 23. The solar panels are connected to the one or more batteries of the power supply in order to perform charging thereof, thereby powering the mobile platform at least partially through renewable solar energy.

Figure 15A:
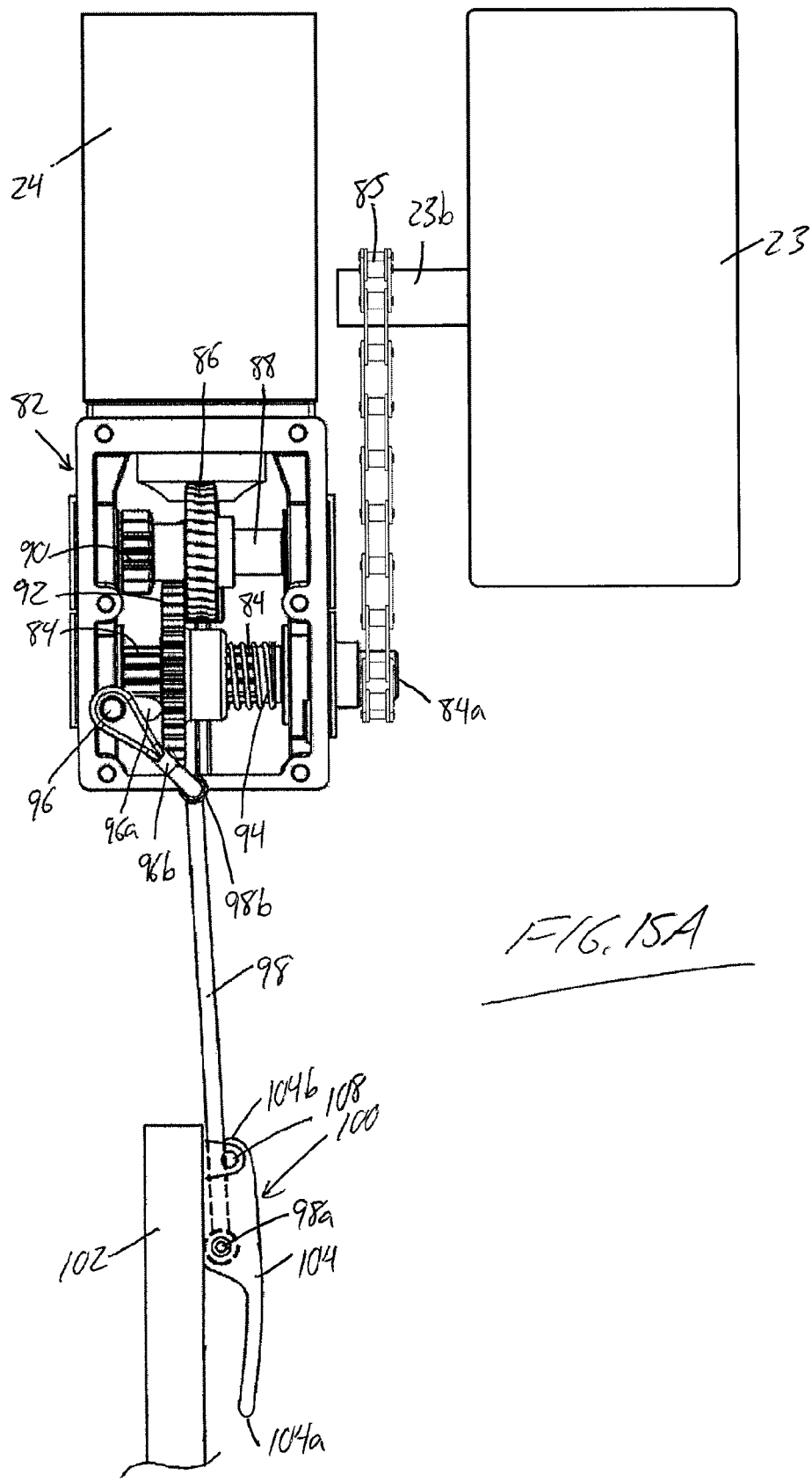
FIGS. 15A and 15B schematically show an overhead plan view of a drive disengagement mechanism of the apparatus of FIG. 9 for selectively disengaging one of the drive wheels from its respective motor, with FIG. 15A showing the mechanism in a disengaged state decoupling the respective wheel from its motor and FIG. 15B showing the mechanism in an engaged state enabling driven rotation of the wheel by its motor.
Figure 15B:
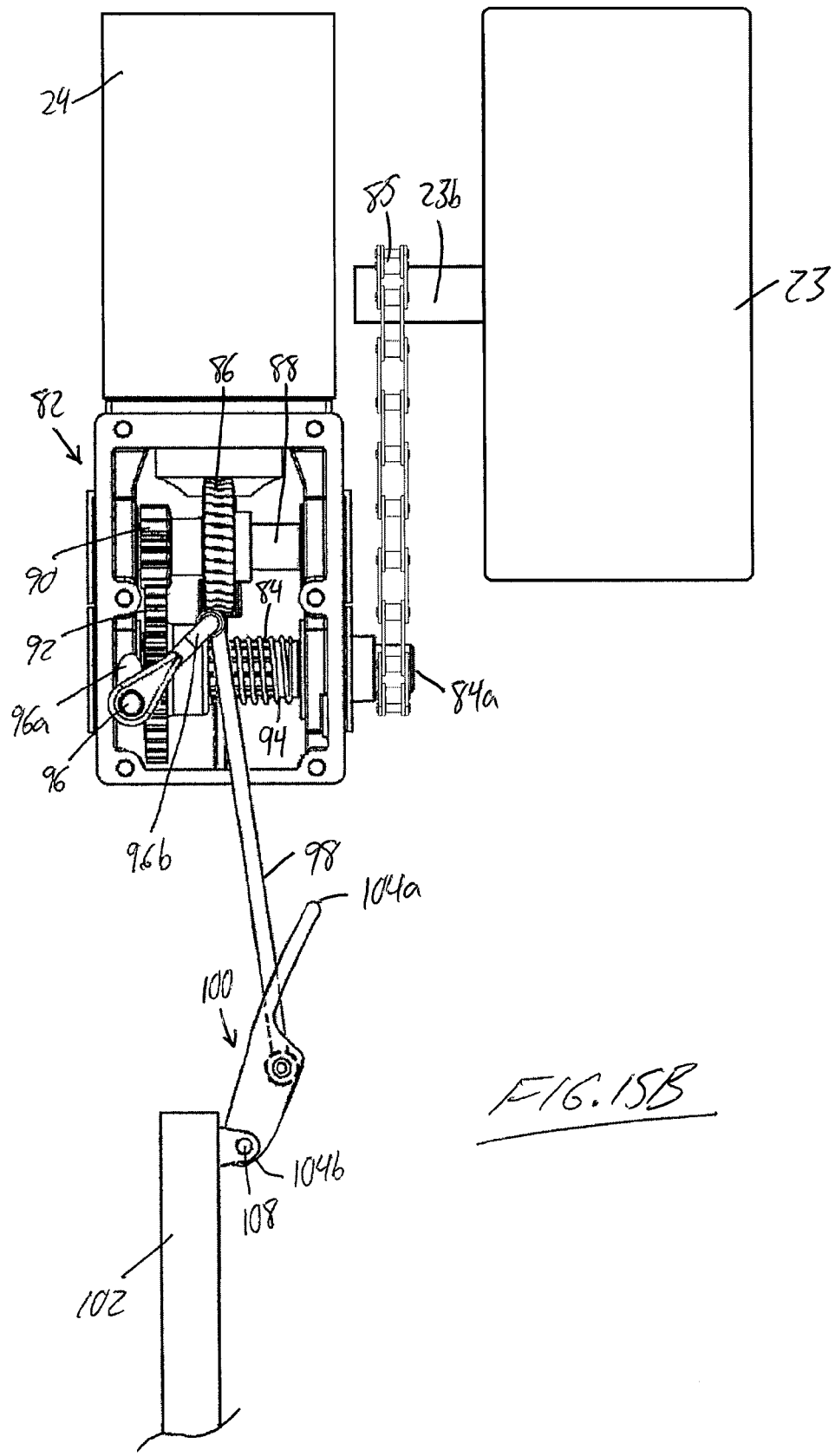

FIGS. 15A and 15B show a drive wheel disengagement mechanism for selectively decoupling a respective one of the drive wheels 23 from its respective positioning motor 24. The figure shows one such mechanism installed on the mobile platform 21 at a respective side of the housing 52, but it will be appreciated that a second like mechanism is found at the opposing side of the housing. A gearbox 82 is connected between each positioning motor 24 and its respective drive wheel 23. The illustrated embodiment uses a known type of gearbox used in motorized wheelchairs. The gearbox 82 features an output shaft 84 having an external working end 84a disposed outside the housing of the gearbox for power-transmitting connection to the respective drive wheel 23, for example via a drive chain 85 entrained about the gearbox output shaft 84 and the axle 23b of the drive wheel 23, or alternatively by direct mounting of the drive wheel to the output shaft of the gearbox. The output shaft from the motor 24 terminates in a worm, which is engaged with a corresponding worm gear 86 carried on an input shaft 88 of the gearbox, which lies parallel to the output shaft 84. A first spur gear 90 on the input shaft 88 normally engages with a second spur gear 92 on the output shaft 86, as shown in FIG. 15B, such that operation of the motor 24 drives the output shaft 84 via the engagement between the worm, worm gear and two spur gears. The second spur gear 92, while rotationally fixed on the output shaft 84, is axially slidable thereon such that axial displacement of the second spur gear 92 along the output shaft 84 enables sliding of the second spur gear 92 out of engagement with the first spur gear 90, which is both rotationally and axially fixed on the input shaft. A compression spring 94 is coiled around the output shaft 84 between the slidable spur gear 92 and the wall of the gearbox housing from which the exterior end 84a of the output shaft 84 projects. The compression spring 94 thus normally biases the slidable spur gear 92 toward the opposing wall of the gearbox, beside which the first spur gear 90 is fixed on the input shaft 88. Accordingly, the two spur gears are biased into engagement with one another by the compression spring.

To enable rotational decoupling between the motor 24 and the respective drive wheel 23, a cam shaft 96 traverses through a lid of the gearbox, which is omitted from the figures in order to reveal the internal components of the gearbox. The camshaft is journaled to the lid to allow rotation of the camshaft relative to the housing of the gearbox. Inside the gearbox housing, the cam shaft features a cam lobe 96a, which when the spur gears are engaged, resides between the slidable spur gear 92 and the nearest wall of the gearbox housing in a non-working position. Outside the gearbox, a connecting arm 96b reaches radially outward from the cam shaft 96, and is pivotally joined to a connecting rod 98. At a distance from the gearbox 82, an over-center latch 100 is mounted to a frame member 102 of the mobile platform 21, and the actuating lever 104 of the over-center latch is pivotally coupled to the second end of the connecting rod 98. When the spur gears are engaged together, the cam lobe 96a of the cam shaft 96 points tangentially outward from, rather than axially along, the output shaft 84, and the actuating lever 104 of the over-center latch is in a non-latching state with its free end 104a pivoted away from the frame member 102 to which the lever's mounting end 104b is pivotally coupled by pivot pin 108. To disengage the two spur gears from one another, thereby decoupling the drive wheel 23 from its respective motor 24, the free end 104a of the actuating lever 104 is pulled away from the gearbox 82 and into its latching position abutting against the frame member 102, as shown in FIG. 15A. This pulls on the connecting rod 98, which in turn rotates the cam-shaft 96 about its axis so that the cam lobe 96s turns into an axially-pointing orientation along the output shaft 84. During this rotation of the cam shaft 96, the cam lobe 96a pushes on the slidable spur gear 92, which therefore slides axially along the output shaft 84 against the resistance of the compression spring 94. This disengages the slideable spur gear 92 from the first spur gear 90 in order to decouple the output shaft 84 of the gearbox from the motor. This disengaged state is maintained due to the over-center position achieved by the pivotal joint 98a of the connecting rod 98 and lever 104 relative to the pivotal joint 98b of the connecting rod and connecting arm 96b.

Figure 18:
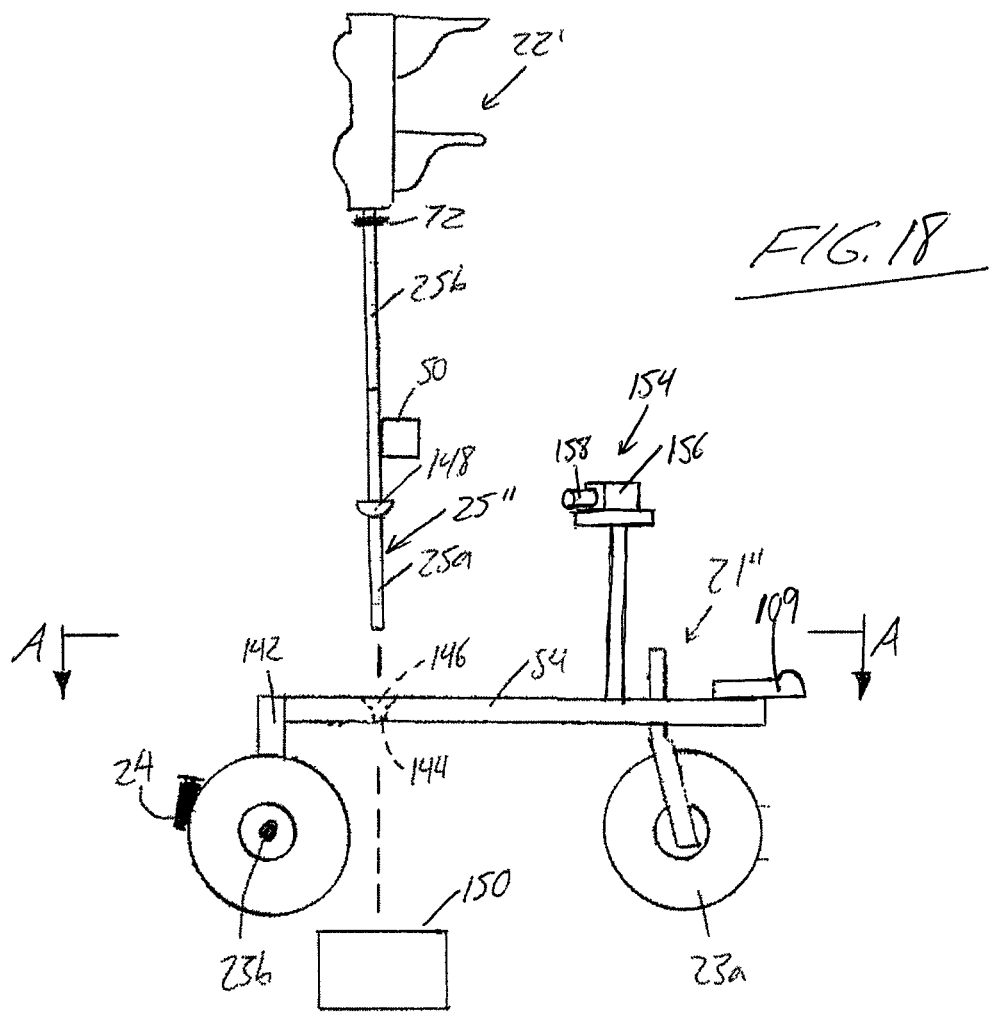
FIG. 18 is a partially exploded schematic elevational side view of another embodiment of the remote controlled mobile traffic control apparatus featuring a self-plumbing indicator support shaft that is pivotally mounted to a mobile platform of the apparatus to maintain a vertically upright state.
Figure 19:
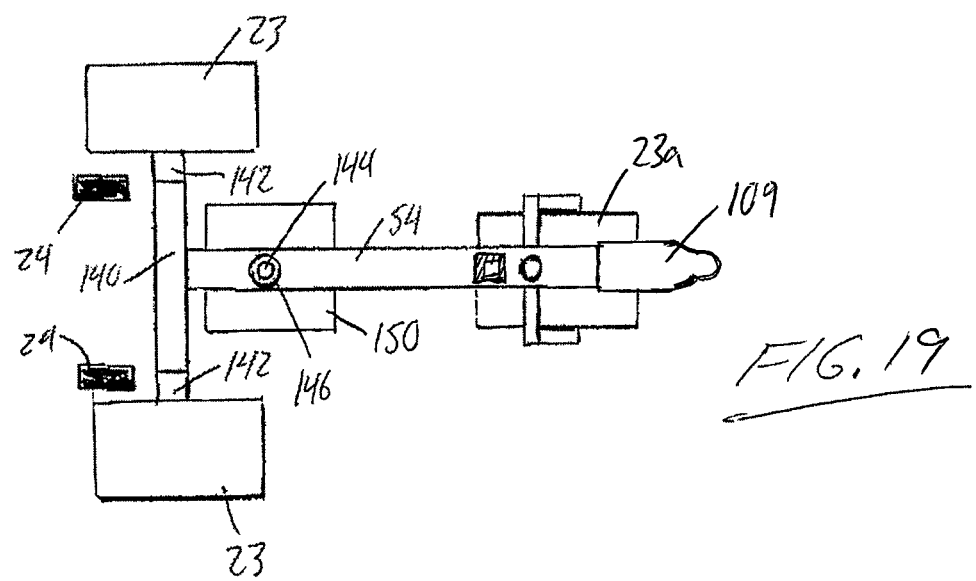
FIG. 19 is a cross-sectional view of the apparatus of FIG. 18 as viewed along line A-A thereof.

With such disengagement achieved for both wheels by forcing the respective levers 100 into the latching position of FIG. 15A, both drive wheels are thus in a free-wheeling state in which the drive motors no longer provide resistance to attempted rotation of the drive wheels by outside motive forces. This makes the mobile platform easier to manoeuvre manually if need be, e.g. in the case of an inadvertently depleted battery rendering the remote controlled positioning inoperable, or in the case of using a two-vehicle to transport the apparatus long distances (e.g. to and from a work zone). For such transports purposes, a vehicle hitch connector (e.g.

hitch socket) may be mounted to the mobile platform at the rear end thereof so that the two disengaged drive wheels of the apparatus trail behind the caster wheel during such towed conveyance of the apparatus. The caster wheel may be raiseable and lowerable relative to the frame of the mobile platform so as to be raiseable out of engagement with the ground during towing. FIGS. 18 and 19 illustrate such inclusion of a hitch connector 109 in the context of another embodiment. Instead of a hitch connector rigidly mounted on the mobile platform frame for coupling with a vehicle hitch, a short tow rope may alternatively be used. The over center position of the rod-lever pivot joint 98*a* relative to the arm-rod pivot joint 98*b* in the latched state of the lever 104 prevents the return of the slidable spur gear 92 to its engaged position until the lever is pulled sufficiently far out of its latched position to release the over-center locking action.

In another embodiment, disengagement of each wheel from its motor may be achieved by other means, for example by having a wheel hub rotatably coupled to the motor output, whether directly or via a gearbox, and then having the wheel rotationally coupled to the hub by a spring loaded pin for rotation of the wheel by motor-driven rotation of the hub, whereby release of the spring-loaded pin rotationally decouples the wheel from the hub to place it in freewheeling relation thereto.

Figure 16:
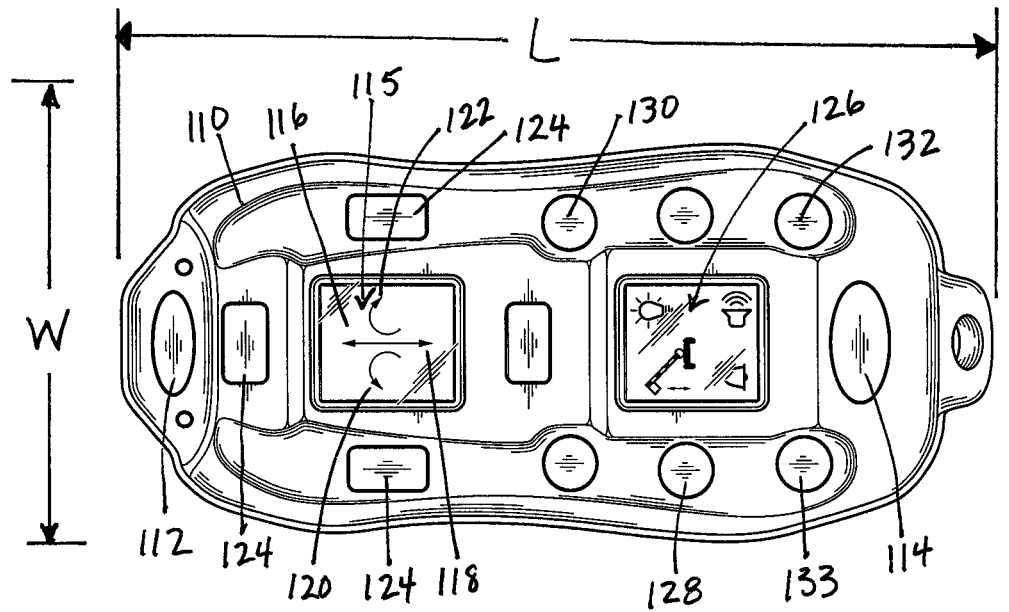
FIG. 16 is a plan view of one embodiment of wireless remote control useful with the apparatus of FIG. 9.

FIG. 16 illustrates a wireless remote control 34' useful with the apparatus of FIGS. 9 through 16, or with other embodiments of the apparatus. The remote control is of a known type employing motion sensors that enable control of various output command signals through movement of the overall remote control in three dimensional space. The remote has a longitudinal dimension L, which exceeds both a width dimension D and a thickness dimension, which are both orthogonal to the length dimensional and orthogonal to one another. The remote is sized for holding in one hand of a user, with the fingers wrapped around the width and thickness across an underside of the remote, leaving the user's thumb free to operate a set of operational buttons located at an opposing a topside 110 of the remote. When switched into a "drive mode" or "positioning mode" operation, the motion sensors in the remote monitor detected movement of the remote in three dimensional space, and the remote compares the detected movement against stored data that correlates particular pre-defined movements of the remote to particular commands to be issued in the outgoing signals from the remote. An example of such motion based remote control operation useful by the remote control of the present invention is found in U.S. Pat. No. 9,199,825, the entirety of which is incorporated herein by reference.

In one embodiment, the pre-defined movements include forward tilting of the remote about a pitch axis to send a "forward drive" command to the mobile platform that causes the locomotion system to drive the mobile platform in a forward direction, rearward tilting of the remote about the pitch axis to send a "rearward drive" command to the mobile platform that causes the locomotion system to drive the mobile platform in a rearward direction, left tilting of the remote about a roll axis to send a "left turn" command to the mobile platform that causes the locomotion system to turn the mobile platform leftward, and right tilting of the remote about the roll axis to send a "right turn" command to the mobile platform that causes the locomotion system to turn the mobile platform leftward.

In the illustrated embodiment, the operational buttons include two power-control buttons 112, 114 disposed adjacent longitudinally opposite ends of the remote control 34'. One of these power control buttons 112 is green colored and located adjacent a front end of the remote, while the other power control button 114 is red colored and located adjacent the opposing rear end of the remote. To power up the remote control, the two mode control buttons must be operated in a predetermined sequence, for example, depressing and holding the red button, and with the red button held, depressing and holding the green button, then releasing the red button, and finally releasing the green button. The red mode button 114 acts as a termination button that will instantly power-off the remote when depressed. By requiring a specific multi-step sequence of button operations to activate the remote, but requiring only a single button depression to deactivate the remote, safety is maximized by preventing unauthorized personnel from powering up the remote, while allowing fast, easy termination of the remote control operation of the mobile apparatus using a single button press.

An on-board drive-mode display screen 115 near the first mode button 112 at the front end of the remote provides a visual representation of the manual tilting gestures used to generate the desired commands in the drive mode of operation, with forward and backward linear arrow icons 116, 118 pointing opposite directions longitudinally of the remote to denote the forward and rearward tilting actions for forward and reverse driving of the mobile platform, and with curved arrow icons 120, 122 pointing laterally outwardly toward opposing sides of the remote to denote left/right tilting for left and right turning of the mobile platform. The aforementioned pitch axis lies in the width direction of the remote, while the roll axis lies in the longitudinal direction thereof.

Figure 17:
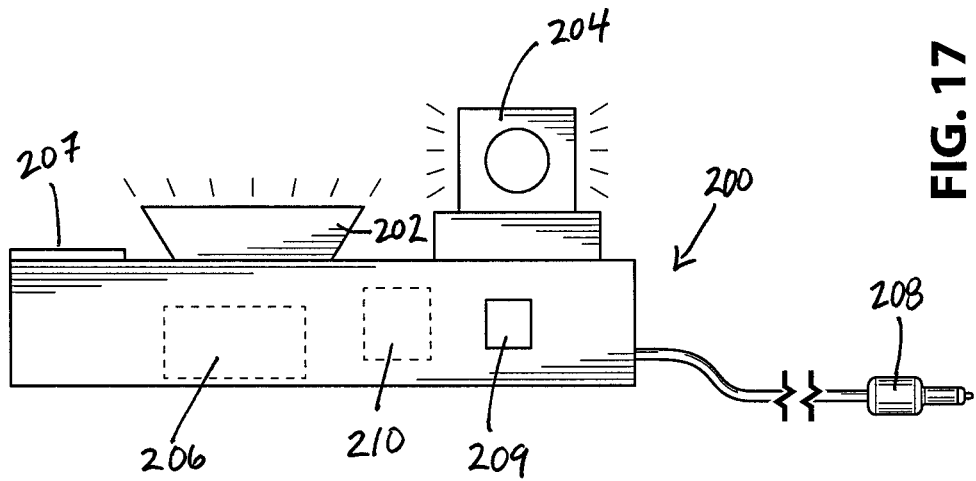
FIG. 17 is a schematic elevational view of a portable alarm unit co-operable with the wireless remote control of FIG. 16.

The remote control of FIG. 17 includes four "drive mode" buttons 124 situated around the display screen. Depression of any drive mode button will initiate the "drive mode" operation of the remote in which motion of the remote in the hand of the operator is detected, and converted into outgoing command signals sent to the mobile apparatus if the detected movements match the pre-defined control movements. While the illustrated embodiment includes multiple drive mode buttons for user-selection of the drive mode button most comfortably accessed by the thumb of a particular user, a single drive mode button is sufficient to enable operation in other embodiments.

The drive mode operation of the remote is maintained so long as the depressed drive mode button is held down, but is instantly terminated upon release of the depressed drive mode button for safety purposes, thereby preventing unintentional movement of the mobile platform. In the present embodiment, additional safety is established by requiring that the remote control be oriented in a generally level position placing its longitudinal and width axes (i.e. roll and pitch axes) in a generally horizontal plane, as confirmed by the motion sensors, before the drive mode can be initiated by the depressed state of a drive mode button. This level position denotes a default non-tilted orientation of the remote, representing a static condition of the mobile apparatus. From this default orientation of the remote, forward tilting (i.e. lowering the front end of the remote about the pitch axis from its default level position) drives forward conveyance of the mobile apparatus, rearward tilting (i.e. lowering the rear end of the remote about the pitch axis from its default level position) drives rearward conveyance of the mobile apparatus, left tilting (i.e. tilting the left side of the remote downwardly about its roll axis) steers the mobile apparatus leftward, and right tilting (i.e. tilting the right side of the remote downwardly about its roll axis) steers the mobile apparatus rightward.

At another display area, which in the illustrated example is presented by a separate second display screen 126, but alternatively may be different area of the same screen that displays the drive arrow icons, other on-screen icons are displayed adjacent respective operational buttons of the remote to visually represent respective commands associated with these buttons. One icon, for example showing a barrier arm and a pair of up and down arrows beside same, denotes that each press of the respective button 128 will lift or lower the barrier arm 50 from its current position (deployed or retracted) to the other. In the present embodiment, the remote control 34' and the control module 29 of the mobile apparatus are configured to operationally link the lowering and raising of the barrier arm with the activation and deactivation, respectively, of the red STOP light 122*a*, and with the deactivation and activation, respectively, of the yellow/amber CAUTION light 122*b*. Accordingly, the barrier arm control button 128 also doubles as the traffic indication control button, where the resulting signal from the remote control denotes a mode-switch command at the control module 29 of the apparatus for both the indicator lights 22*a*, 22*b* and the barrier arm. The one button 128 thus switches each of these elements from between its two possible states: ON/OFF for the lights, and DEPLOYED/RETRACTED or LOWERED/RAISED for the barrier arm. In this scenario, one depression of button 128 thus lowers the barrier arm, activates the red STOP light, and deactivates the yellow/amber CAUTION light. A second depression of button 128 performs the reverse operation, raising the barrier arm, deactivating the red STOP light, and activating the yellow/amber CAUTION light.

Such co-dependent actions at the mobile apparatus from a singular incoming signal can be accomplished using mechanical relays for dependent control of some components based on the state of the activation circuits for others, or alternatively performed using other electronic control methods, such as programmable logic or code in a microcontroller or the like. In one implementation, the mobile apparatus may be configured to continuously illuminate the normally flashing yellow/amber light for a brief transition period before lowering the barrier arm and activating the red light, which again can be accomplished using relays in the control circuitry or programmed logic or code. In other embodiments, separate buttons may be employed to control the barrier arm and the lights, and the lights may also be switched between their modes of operation at least semi-independently of one another, e.g. to allow both lights to simultaneously occupy an OFF state. Alternatively or additionally, one or more manual switches (e.g. toggle switches) may be included on the mobile platform to establish and terminate power to the electronic components thereof, for example including two manual toggle switches to respectively terminate power to the traffic control indicator 22' and the entire control module 29, or at least the receiver thereof.

Another icon, for example in the form of a lightbulb, denotes an auxiliary light function of a respective button 130 that activates auxiliary lighting on the mobile apparatus to improve the visibility thereof during nighttime use. Another icon shows a speaker symbol denoting that depression of the respective button 132 will initiate an audible alarm on the mobile platform apparatus, which may be activated by the operator to alert workers or vehicles in the vicinity of the mobile apparatus of movement of the mobile apparatus that is currently being, or about to be, performed via the remote control.

Yet another icon, for example in the form of an alarm bell, denotes a worker alarm function of a respective button 133 that activates a portable alarm unit 200 show in FIG. 17. Alternatively, this alarm activation function may be provided by the green button 112 at the front end of the remote control, reducing the likelihood of activating a false alarm by placing this alarm button further away from the other operational buttons. In such instance, the green button is initially used in the power-up sequence of the remote, and once the remote is activated, then serves as the alarm button. An ALARM label may be applied around or near the green button to denote this secondary function. The alarm unit 200 is separate from both the remote control 34' and the mobile platform apparatus 20', and has an audible alarm 202 and/or a visual alarm 204 such as a strobe or rotating beacon. The portable alarm unit may be self-powered by an on-board battery 206, and may include one or more solar cells 207 for recharging of said battery, and/or or may have a power connector 208 for connection to the electrical system of a work site vehicle, such as a truck, paving machine, excavator, grader, etc. for either direct powering of the alarm unit or charging of the alarm unit battery by the vehicle. The portable alarm unit may be mounted atop a portable or collapsible stand, or mounted to the worksite vehicle. The operator of the remote control 34', responsible for monitoring and controlling the mobile platform apparatus 20', can use the alarm button 133 of the remote to activate the alarm(s) of the alarm unit to inform one or more members of the work crew in the work zone of the unauthorized or unsafe entry of a vehicle to the workzone upon visual identification by said operator of such a vehicle that is either approaching or passing the mobile platform apparatus at an excess speed, or that is bypassing the mobile platform apparatus despite the display of the STOP indicator thereby. The portable alarm unit 200, being separate from the mobile platform apparatus can be situated in the immediate vicinity of the working crew to ensure the audible and/or visual alarms will be readily detected by the working crew, especially in scenarios where the mobile platform apparatus 20' is at a significant distance from the work crew, i.e. when the work crew is significantly down-road from the start of the work zone, where the mobile platform apparatus may typically be found.

The audible alarm of the portable alarm unit may be operable to emit different alarm tones representing different safety hazard situations, for example being actuable by the respective remote controls of two different mobile platform apparatuses placed at the opposing ends of the work zone. This way, two respective human operators of the two respective remotes of the mobile platform apparatuses can trigger different audible tones at the portable alarm unit, whereby the working crew can decipher the two distinct tones from one another to identify which direction the speeding or unauthorized vehicle is approaching from, and can accordingly take cover behind an appropriate side of a nearby vehicle, machine or structure accordingly. Likewise, the visual alarm may have two visually distinct components, for example two differently coloured lights sources (e.g. strobes or rotating beacons) corresponding to a different directional approach of the hazard. The alarm unit 200 may also feature a local activation mechanism in the form of an onboard trigger switch 209 operable by a member of the work crew upon realizing a hazard not detected by the human operator of the mobile platform apparatus, whereupon the audible and/or visual alarm will quickly inform his crew mates of a safety hazard.

With all operations of the remote being operable with one hand, the other hand of the human operator remains free for other tasks, such as operation of a hand-held radio to communicate with other members of the work crew. While the illustrated embodiment uses electronic display screens to present the user with the icon-based representations denoting the different operational functions of the remote, these representations may alternatively be displayed by other means, such as one or more stickers applied to the housing of the remote, indicia painted or printed on the housing, indicia integrally molded into the remote housing during manufacture in the form of embossed or recessed areas of the housing's outer surface, or unique shaping of the individual buttons themselves according to their function. In addition or alternative to the visual representations of the functions, the buttons may have different shapes (rectangular, round, triangular, hexagonal, etc.), colours and/or tactile textures by which the operator can easily distinguish the buttons from one another.

Figure 20:
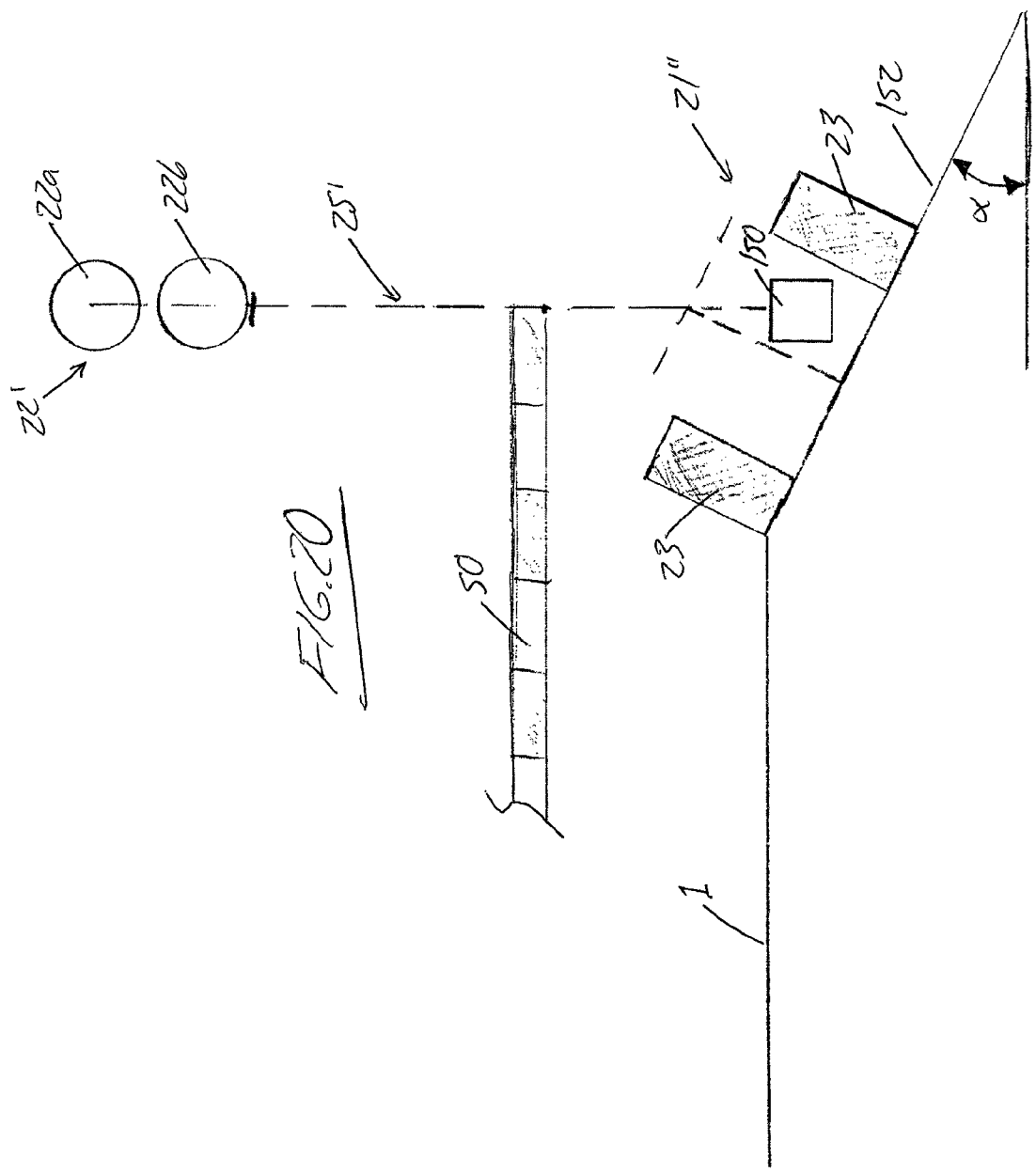
FIG. 20 is a simplified schematic rear view of the remote controlled mobile traffic control apparatus of FIG. 18 in an assembled state, and demonstrating the self-plumbing action of the indicator support shaft.

FIGS. 18 through 20 schematically illustrate another embodiment of the mobile apparatus, which shares the same two-light traffic control indicator 22' as the preceding embodiment and likewise includes a traffic barrier arm 50', but differs in the addition of a self-plumbing mechanism by which the support shaft 25" of the control indicator 22' is carried will automatically acquire a vertically upright orientation regardless of whether the wheeled mobile platform 21" is disposed atop a level horizontal ground surface. FIGS. 18 and 19 schematically illustrate the mobile platform 21" in a simplified form with the housing 52 and other select components omitted. The longitudinal spine or backbone 54 of the platform's frame lies longitudinally of the mobile platform at the mid-plane thereof with the caster wheel 23a coupled to the backbone 54 at the rear end of the mobile platform. A cross-bar 140 of the frame lies perpendicularly of the backbone 54 at the front end thereof, and wheel-supports 142 reach downward from opposite ends of the cross-bar to rotatably carry the respective stub axles 23b of the drive wheels. Accordingly, the two drive wheels 23 and their respective positioning motors 24 are situated on opposite sides of the mid-plane of the mobile platform at the front end thereof, like in the earlier three-wheeled embodiment. Other details such as the housing, the control module, the gearboxes, the disengagement levers, and the solar panels are omitted for illustrative simplicity.

The two-light indicator 22' is once again mounted atop a telescopic support shaft 25". However, unlike the earlier embodiment in which the lower shaft section 25a is rigidly fixed to the mobile platform, the lower shaft section 25a is instead coupled in a pivotal manner to the frame of the mobile platform to allow the support shaft 25" to tilt relative to the frame. In the illustrated example, the pivotal joint between the mobile platform 21" and the support shaft 25" is configured similar to a ball-joint, thereby providing multi-directional functionality to the pivotal joint so that the shaft 25" can tilt in any direction relative to the mobile frame 21". To achieve this, a through-hole 144 passes perpendicularly through the backbone 54 of the platform frame from the topside thereof to the opposing underside, and a bowl-shaped recess 146 in the topside of the backbone 54 communicates concentrically with the through-hole 144 to form a rounded upper end thereof with a spherically concave bowl-shape. A stop collar 148 is affixed to the lower section 25a of the indicator support shaft 25" at an intermediate location between the top and bottom ends of the lower section 25a. The stop collar 148 and has a spherically convex underside that is seated conformingly within recessed bowl 146 in the frame of the mobile platform. The bottom end of the lower shaft section 25b passes downwardly from the stop collar via the through-hole 144 so as to hang beneath the backbone of the mobile platform frame in the mid-plane thereof. The concave and convex surfaces of the recessed bowl and stop collar are in sliding relation to one another, while the diameter of the through-hole 44 exceeds that of the lower shaft section 25a, whereby the support shaft can pivot in any direction relative to the mobile platform.

As an alternative to the shaft passing through the spine or backbone of the frame and having an appropriately contoured stop collar at an intermediate location on the lower shaft section, the lower shaft section may be divided into two separate halves, with one half disposed above the spine/backbone and the other disposed therebelow. A bottom end of the upper half would be seated in the bowl to enable the tilting action, and may have a convexly spherical contour conforming to the bowl. A downward reaching fork emanating from the upper half above the bowl-received lower end thereof would reach downwardly past the spine/backbone on opposing sides thereof to meet with a corresponding upward reaching fork likewise extending upwardly from the lower half on the opposing sides of the spine/backbone. The two forks would join together to link the upper and lower halves of the shaft section together into a singular unit across the spine/backbone, whereby this collective shaft unit bifurcated around the spine/backbone can tilt back and forth thereacross and therealong under pivotal movement of the lower end of the upper half in the bowl-shaped recess of the spine/backbone. The forks would be dimensioned to provide sufficient clearance for side-to-side tilting of the overall shaft unit. While the illustrated embodiment features a telescopic shaft, a rigid fixed-length shaft or a shaft with an upper folding section above the spine/backbone may alternatively be used.

A battery carrier 150 is affixed to the bottom end of the lower section 25a of the indicator support shaft and contains the one or more batteries of the mobile platform's power supply, for example two deep cycle batteries of notable weight that greatly exceeds that of the traffic control indicator 22' at the top end of the support shaft. The battery carrier 150 and the batteries contained therein thus hang below the backbone of the mobile platform frame, and act as a pendulum or counter-weight that acts to counter the tendency of the traffic control indicator 22' to tilt out of a vertically upright orientation when the mobile platform is parked atop, or traverses across, non-horizontal or uneven terrain. The significant weight of the batteries relative to the lighter traffic control indicator is sufficient to totally overcome such tilting tendency as the lighter traffic control indicator 22', and thus automatically retain a vertically upright orientation of the support shaft 25". The battery carrier 150 is centered on the axis of the support shaft 21', and is configured to likewise place the collective center of mass of the batteries on the axis of the support shaft 25'.

The resulting effect is shown in FIG. 20, where the mobile platform 21" is parked at a sloped surface 152 neighbouring the road surface 1 at which traffic is to be controlled. The plane of contact between the drive wheels 23 of the mobile platform and the underlying ground surface is thus obliquely oriented relative to the road surface, as demonstrated by angle α, whereby an affixed indicator support shaft would inherently reside in a tilted, non-vertical orientation. However, the pivotally supported support shaft 25" of the present embodiment automatically acquires and maintains a vertical orientation due to the relative movement allowed to occur in the pivot joint between the support shaft and the mobile platform, whereby the support shaft can tilt relative to the mobile platform in the lateral direction thereof, as shown in FIG. 20.

In the illustrated embodiment, where a spherical ball joint configuration is employed for this movable connection between the mobile platform and the indicator support shaft 25', relative tilting therebetween is allowed in any and all directions. Accordingly, should the mobile platform reside on a surface that is non-horizontal or uneven in the longitudinal direction of the mobile platform (i.e. between the front-end drive wheels 23 and the rear-end caster wheel 23*a*), the support shaft can also tilt longitudinally of the mobile platform and maintain a proper vertical orientation. This multi-directionality of the joint thus allows the shaft to maintain a vertical orientation both in longitudinally vertical and laterally vertical planes of the vehicle (i.e. vertical planes respectively parallel to the longitudinal and lateral directions of the vertical).

As schematically shown in FIG. 19, the barrier arm 50 is movably supported on the indicator support shaft 25' in this embodiment, rather than being separately mounted on the mobile platform like in the earlier embodiment. As shown in FIG. 20, this allows the barrier arm 22 to extend in a truly horizontal orientation in the deployed position due to the self-plumbed vertical orientation of the indicator support shaft, regardless of whether or not the mobile platform is parked on, or traversing, a horizontal surface. The barrier arm may employ the same removable mounting details as the earlier embodiment, but with the seat 62 and actuator 64 pivotally mounted to the lower section 25*a* of the indicator support shaft 25" rather than to separate stanchions.

While the illustrated embodiment has the concave half of the spherical pivot joint on the mobile platform and the convex half of the spherical pivot joint on the stop collar of the support shaft, it will be appreciated that this configuration may be reversed. While a ball joint is used in the illustrated embodiment for tilting in any direction, other embodiments may use a unidirectional joint allowing relative tilting in only on direction, e.g. laterally of the frame, to account for the relative angling of shoulder and ditch surfaces relative to the adjacent roadway, where the most variation would be expected, compared to the grade of the road in the direction of traffic flow. While the illustrated self-plumbing embodiment features a three-wheeled mobile platform, it will be appreciated that the self-plumbing mechanism may likewise be used on mobile platforms in which the type and quantity of ground-engagement members vary, for example including various wheel, track and ski configurations. Likewise, the self-plumbing mechanism and associated function may be employed regardless of whether the indicator is an illuminated indicator with one or more lights, a rotatable multi-sided sign, or other indicator switchable between different display modes.

Instead of enabling self-plumbing of the traffic control indicator support by way of a pivotal connection between the support and the mobile platform, another embodiment could use a self-plumbing mechanism that instead levels out the mobile platform when on sloped or uneven ground by using level sensor or gyros that cooperate with adjustable wheel carriers that are movable relative to the frame of the mobile platform by respective actuators in order to raise/lower the respective wheels/tracks/skis of the locomotion system relative to the frame of the mobile platform and relative to one another. On detecting a tilted non-horizontal condition of the mobile platform from the sensors/gyros, an electronic controller of this mechanism would lower the respective wheel/track/ski at the side or end of the mobile platform that is detected to be lower than the opposing side or end, and/or raise the respective wheel/track/ski at the opposing side or end, thereby leveling out the mobile platform.

One such embodiment is shown in FIGS. 23A and 23B, where the two wheel supports 142' at the ends of the cross-bar 140 of the mobile platform frame each feature a screw actuator whose motor 142*a* is affixed to the cross bar 140 of the frame and whose threaded output shaft 142*b* reaches downwardly from the motor and is rotatably driven thereby. Each wheel support 142' also features a respective wheel carrier 142*c* having two upright bores passing through it. One bore is threaded, and the other is smooth-walled. The externally threaded output shaft 142*b* of the actuator is engaged in the threaded bore of the wheel carrier. Each wheel support also features a smooth-walled guide shaft 142*d* depending downwardly from the cross bar of the frame in parallel relation to the threaded output shaft of the screw actuator. The guide shaft 142*d* passes through the smooth-walled bore of the wheel carrier 142*c*. Operation of the screw actuator in opposing directions is thus operable to raise and lower the respective wheel.

Accordingly, at the detected lower side of the non-level mobile platform, the screw actuator is driven in an advancing direction forcing the wheel carrier downwardly away from the frame of the mobile platform to lower the respective wheel relative thereto, thus pushing this wheel against the uneven or sloped ground surface to raise this side of the mobile platform. Additionally or alternatively, at the detected higher side of the non-level mobile platform, the screw actuator is driven in a retracting direction drawing the wheel carrier upwardly toward the frame of the mobile platform to raise the respective wheel relative thereto, thus lowering this side of the mobile platform. Such raising/lowering the respective wheel is performed until a reference plane of the mobile platform reaches a level horizontal orientation.

The illustrated embodiment features a screw actuator for each side of the mobile platform, in which case raising of the wheel on the high side and lowering the wheel on the low side can be performed simultaneously to quickly level the mobile platform. Other embodiments may feature a wheel raising/lowering actuator only on one side, and perform a raising or lowering action depending on whether that side is detected as higher or lower than the opposing side. At each wheel support, the guide shaft prevents the wheel carrier and attached wheel from swiveling about the threaded output shaft of the actuator. Use of a screw actuator is just one example, as one or more linear actuators could alternatively be used at each height-adjustable wheel support.

With the indicator support shaft 25'/25" or other indicator support structure standing perpendicularly upright from a reference plane of the mobile platform, levelling of this reference plane into a horizontal orientation in this manner would automatically place the indicator support in a vertical orientation. The potential downside of such an embodiment relative to the mechanical pendulum-like embodiment of FIGS. 18-20 is the increased electrical power requirement of the electronically controlled self-plumbing action, and potentially greater component cost.

Figure 25:
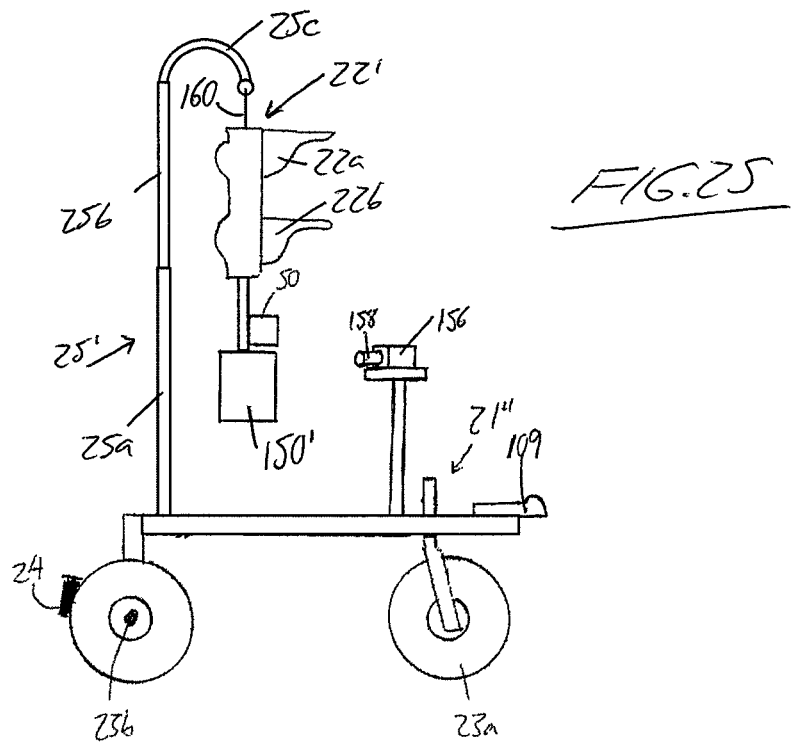
FIG. 25 shows a schematic side elevational view of another embodiment of the remote controlled mobile traffic control apparatus with a self-plumbing function, where the traffic control indicator is hung in a swingable position for pendulum-like self-orientation thereof.

Another mechanism for self-orienting the traffic control indicator may use hanging thereof in a free-swinging state, for example from a hooked-over end 25*c* at the top of the support shaft 25' via a rope, chain, cable or other flexible hanging member 160, as shown in FIG. 25. In the illustrated example, where the traffic control indicator is a light fixture having multiple lights 22*a*, 22*b* arranged in a linear along a longitudinal axis of the fixture, the free-hanging state of the fixture at the top end of the its longitudinal axis will gravitationally default the longitudinal axis of the fixture into a vertical orientation. The barrier arm 50 may be mounted to the light fixture to hang therewith so that the barrier arm's deployed position reaches horizontally outward from the vertical light fixture. An extra weight 150 may be attached at the bottom of the support shaft to maximize the self-plumbing or self-righting pendulum effect.

Figure 26:
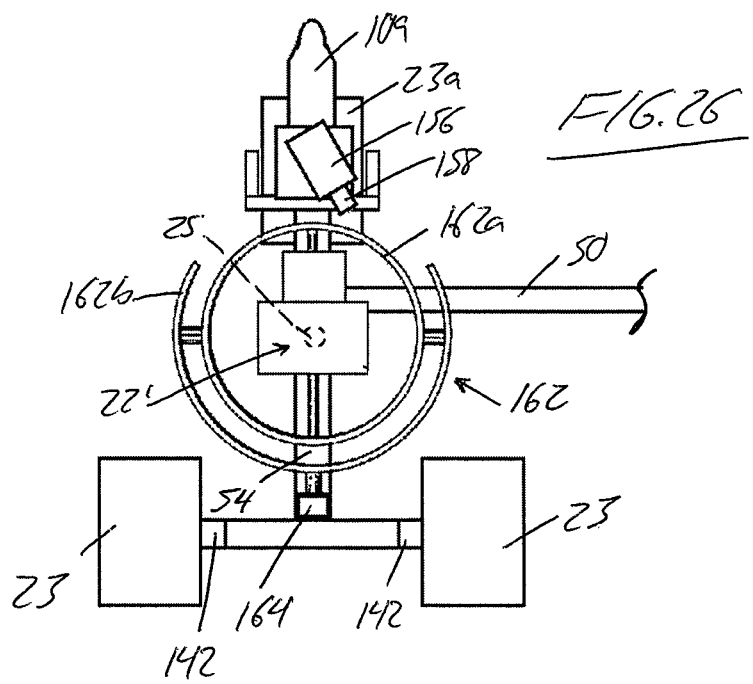
FIG. 26 shows a schematic overhead plan view of another embodiment of the remote controlled mobile traffic control apparatus with a self-plumbing function, where the traffic control indicator is movably supported by a gimbal assembly.

Another option for self-orientation of the traffic control indicator, and optionally the barrier arm if mounted thereto, employs a gimbal assembly 162 to mount the traffic control indicator, as shown in FIG. 26. Here, the traffic control indicator 22' is mounted atop a support shaft 25 which, instead of being attached or joined to the frame of the mobile support platform, is pivotally suspended in an inner gimbal ring 162a, which is turn is pivotally supported in an outer gimbal ring 162b, which in turn is fixed to an mast 164 that is affixed to the mobile platform in a position standing upright therefrom at or near the front end thereof. The lower end of the shaft 25' has a significant counterweight 150' so that the center of gravity of the of the overall unit formed by the shaft 25, traffic control unit 22 and counter-weight resides at an elevation below the connection between the inner gimbal ring and the light fixture housing of the traffic control indicator 22'. The inner gimbal ring pivots relative to the outer ring on an axis lying transversely of the mobile platform, while the support shaft carrying the traffic control indicator 22' pivots on an axis lying in the longitudinally extending mid-plane of the mobile platform. Accordingly, the two-ring gimbal assembly allows for self-correction of the support shaft orientation in response to both longitudinal and lateral tilting of the mobile platform.

Figure 27A:
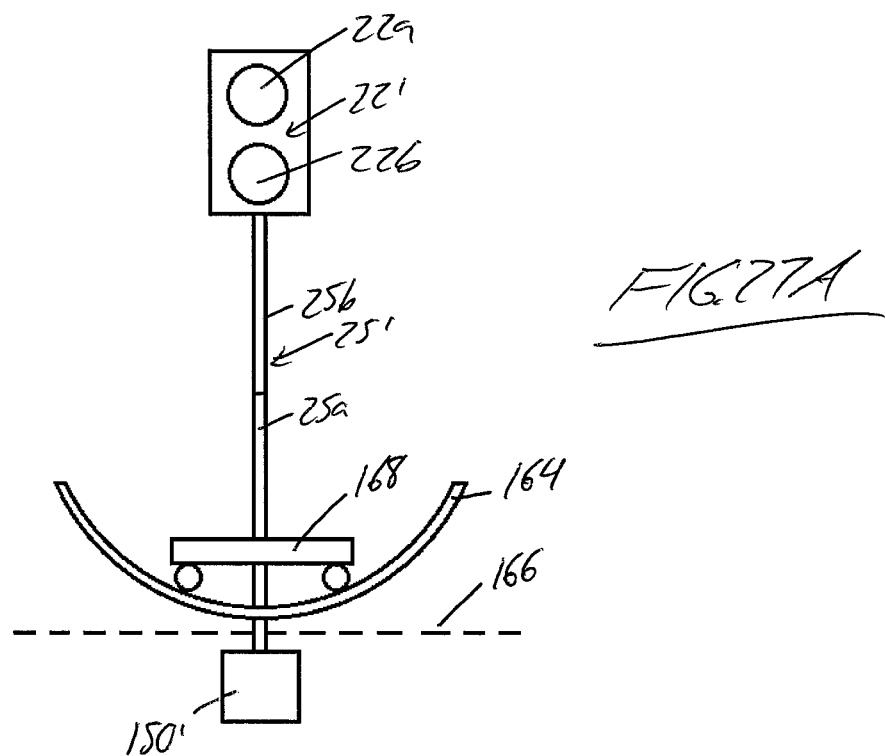
FIGS. 27A and 27B schematically illustrate another embodiment with a self-plumbing function provided by wheeled carrier of the traffic control indicator that rides on a curved track fixed atop the mobile platform.
Figure 27B:
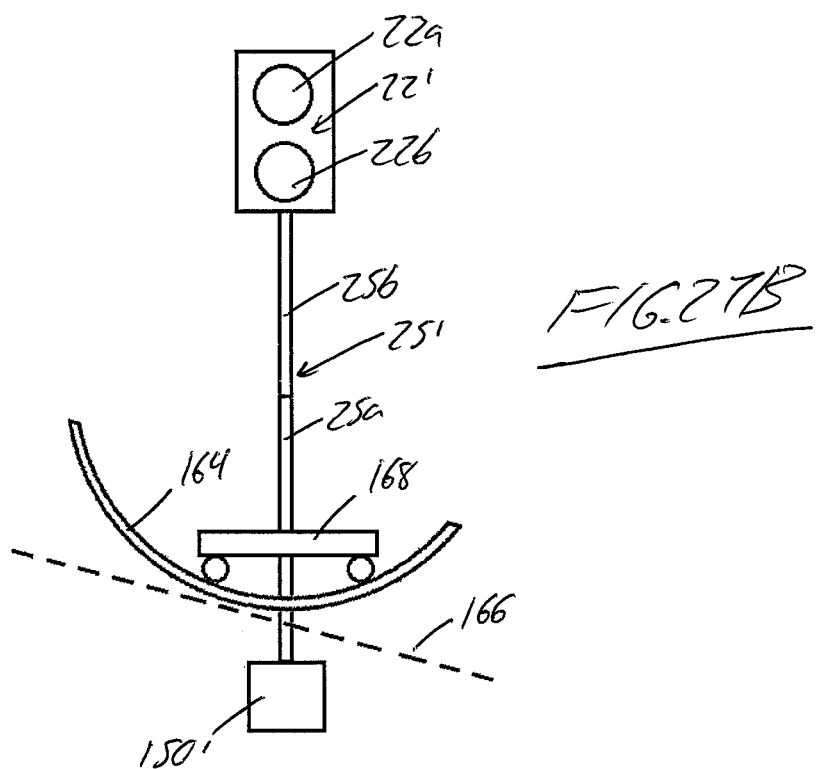

Another option for self-orientation of the traffic control indicator, and optionally the barrier arm if mounted thereto, is shown in FIGS. 27A and 27B. This configuration uses a curved track 164 affixed atop the mobile platform (which is represented only schematically by reference plane 166) and a wheeled carrier 168 from which the support shaft 25' reaches upright to support the traffic control indicator 22'. The track 164 has an upwardly concave shape that curves upwardly towards its ends, and is mounted in a transverse plane of the mobile platform that lies perpendicular to the longitudinal direction thereof in which the platform travels during forward motion. The shaft reaches downwardly through a slot in the track, or via a bifurcation of the shaft that reaches downwardly across the track on opposing sides thereof, to carry a counterweight 150' below the track. As the mobile platform tilts out the ideal horizontal orientation of FIG. 27A and into a tilted state shown in FIG. 27B, the rolling carrier moves along the curved track toward the track's lowest point of elevation. As a result, the support shaft 25' maintains a vertical position in this transverse plane of the mobile platform despite parking or travel of the mobile on at sloped shoulder or ditch of the roadside, or any other sloped or uneven terrain causing tilting the mobile platform out of a level orientation in this transverse direction.

In addition to the pendulum-based self-plumbing mechanism, FIG. 18 also illustrates mounting of an auxiliary module 154 on the mobile platform. This auxiliary module may feature a traffic camera 156, for example in the form of a photo radar camera with its lens 158 oriented to face forwardly of the mobile platform at an oblique to the same side of the mobile platform at the which vehicular travel path is blocked by the deployed barrier arm. This way, the photo radar camera is operable to detect the speed of vehicles passing by the mobile platform, and capture images of the rear license plates thereof in the event that an unlawful or unsafe speed over a predetermined threshold is detected. A wireless data connection to police or other law enforcement service may be provided either within the auxiliary module itself, or within the general control module 29 to transmit recorded photographic images of offenders to the law enforcement service, and or communicate with a license plate recognition system thereof to identify offenders.

The traffic camera may additionally or alternatively include a vehicle counting module or function for monitoring and recording, and optionally transmitting, traffic flow data concerning traffic movement through the work zone, again using either a dedicated wireless transmission point or a wireless transmitter in the general control module. The traffic flow data may be used by government agencies or other entities to gauge the effect of the work zone on regular traffic flow, which can be used for optimization of work zone scheduling and/or other purposes. Alternatively, the vehicle counting module may use one or more sensors to detect and count passing vehicles instead of image-based detection using an onboard camera. In either case, the module may include local data processing means to locally confirm detected vehicles, or may transmit raw image/signal data to remote locations for further processing.

Other components additionally or alternatively included in the auxiliary module 154 may include a GPS (global positioning system) unit, an internet connection by which the mobile platform can serve as a local internet hotspot, a speaker connected to a microphone (wirelessly, or via wired connection) to allow the operator to communicate verbal messages to drivers, etc.

The forgoing embodiments all use manual inputs at the remote control to trigger locomotive operation of the mobile platform. However, other embodiments may additionally or alternatively incorporate "follow me" autonomous vehicle control functionality of the type gaining popularity in the fields unmanned aircraft (drones) and autonomous logistics (cargo transport). In such embodiments, a leader or master unit within the work zone would be automatically followed by the mobile platform, whereby the mobile unit would automatically follow a moving work zone along the road surface without requiring remote controlled locomotion input from a human operator. The human operator's responsibility could thus focus solely on the remote controlled switching of the traffic control indicator between its different modes. In one embodiment, the leader/master unit in the work zone includes a GPS beacon or transponder that uses GPS satellites to track its current location, and communicates this location data to a receiver in the control module 29 of the mobile platform. In such embodiments, the control module 29 is programmed to follow movement of the leader/master unit, for example at a pre-set, user-programmable, or user-selectable distance along the roadway.

So, by comparing a new GPS coordinate of the leader/master unit against a previous GPS coordinate thereof, and finding a difference therebetween denoting a physical movement of the leader/master unit, and comparing this against stored roadmap data, a determination can be made of how far the leader/master unit has moved down-road, whereby the control module can autonomously drive the mobile platform down-road a matching distance in order to maintain the pre-set distance between the leader/master unit and the mobile traffic control platform along the roadway. The calculated down-road distance may be determined at the leader/master unit or at the mobile platform, and the GPS coordinates or calculated travel distance may be pushed from the leader/master unit, or pulled by the mobile platform. In one embodiment, the leader/master unit is the portable alarm unit of FIG. 17, which is thus shown as including GPS tracker module 210 for such purposes.

In another embodiment, instead of GPS-based 'follow me' autonomous locomotion control, image-based 'follow me' techniques may be employed, where a forward facing camera on the mobile platform is coupled to a suitable image processing module which is able to visually detect and identify the leader/master unit by way of unique visual traits possessed thereby or visual cues applied thereto, and calculate a distance between the camera and the leader/master unit in order to maintain the pre-set, user-programmed or user-selected distance between the mobile platform and the leader/master unit. However, due to movement of traffic through the work zone, movement of equipment and work personnel within the work zone, etc., reliable visual sight lines between a camera on the mobile platform and a leader/master unit further down-road in the work zone may not be possible, in which case the GPS approach may prove more useful and reliable.

From the forgoing "follow me" embodiments, it will be appreciated that the control signals received by the receiver(s)/transceiver(s) of the mobile platform's control module 29 need not necessarily be based on human input at the operator's remote control, nor necessarily received from the same remote control responsible for operation of the traffic control indicator. While it is contemplated that the alarm unit may form the leader/master unit in some instances, the leader/master unit role may be fulfilled by other devices likewise situated remotely from the mobile platform within the work zone, for example by a dedicated GPS tracker carried by a worker or mounted in or on a work vehicle or machine, or by a smart phone with GPS functionality, etc.

Figure 21:
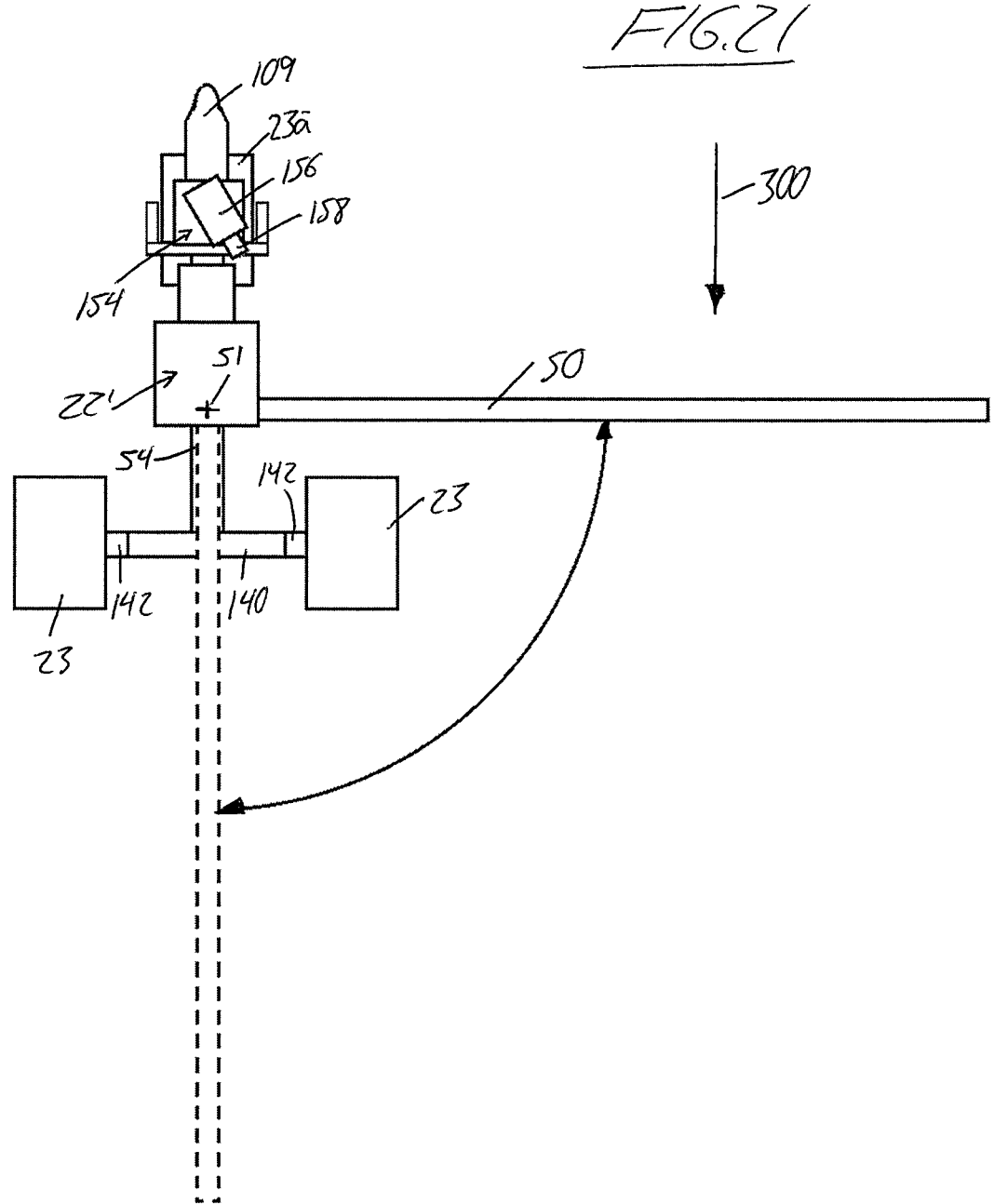
FIG. 21 is a schematic overhead plan view of another embodiment of the remote controlled mobile traffic control apparatus similar to those of FIGS. 9 and 18, but with a traffic barrier arm that swings about an upright axis instead of pivoting up and down about a horizontal axis.

While the earlier embodiments with the traffic barrier arm use raising and lowering of such arm about a pivotal connection to the mobile platform to move between deployed and retracted positions respectively obstructing and not obstructing the travel path of the oncoming traffic, other embodiment may employ different barrier movement options. In one example shown in FIG. 21, instead of the barrier arm pivoting up and down, it swings horizontally about an upright pivot axis 51 between a deployed position reaching laterally outward from the mobile platform to block the vehicular travel path 300, as shown by the solid line position of the barrier arm, and a retracted position lying longitudinally of the mobile platform in generally parallel relation to the vehicular travel path 300 and roadside, but offset laterally from the travel path toward the roadside, as demonstrated by the broken line position of the barrier arm reaching longitudinally forward from the mobile platform toward the work zone.

Figure 22A:
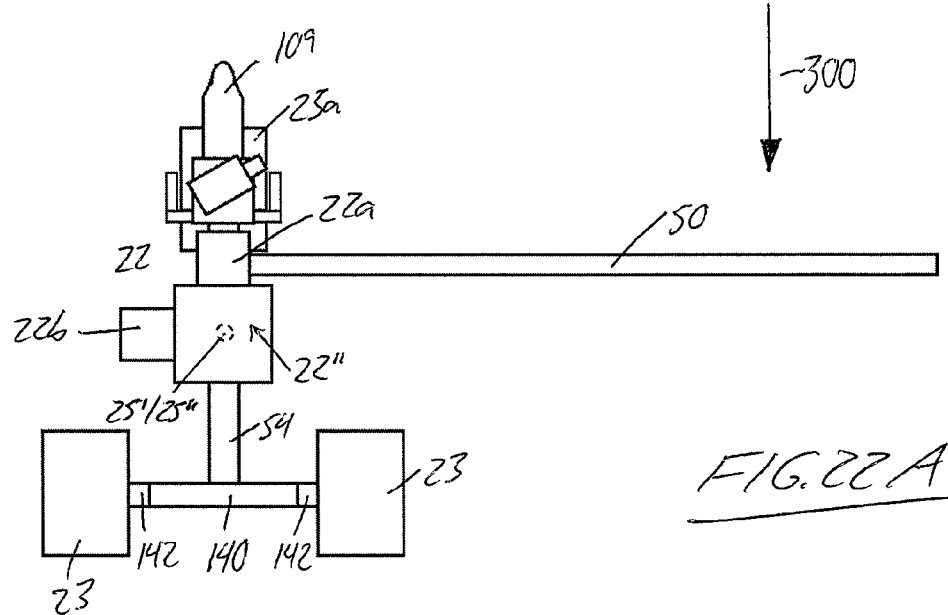
FIGS. 22A and 22B illustrate another embodiment of the remote controlled mobile traffic control apparatus similar to those of FIGS. 9, 18 and 21, but which employs a stationary traffic barrier arm that is moved between deployed and retracted positions by turning of the mobile platform between two orientations facing different directions.
Figure 22B:
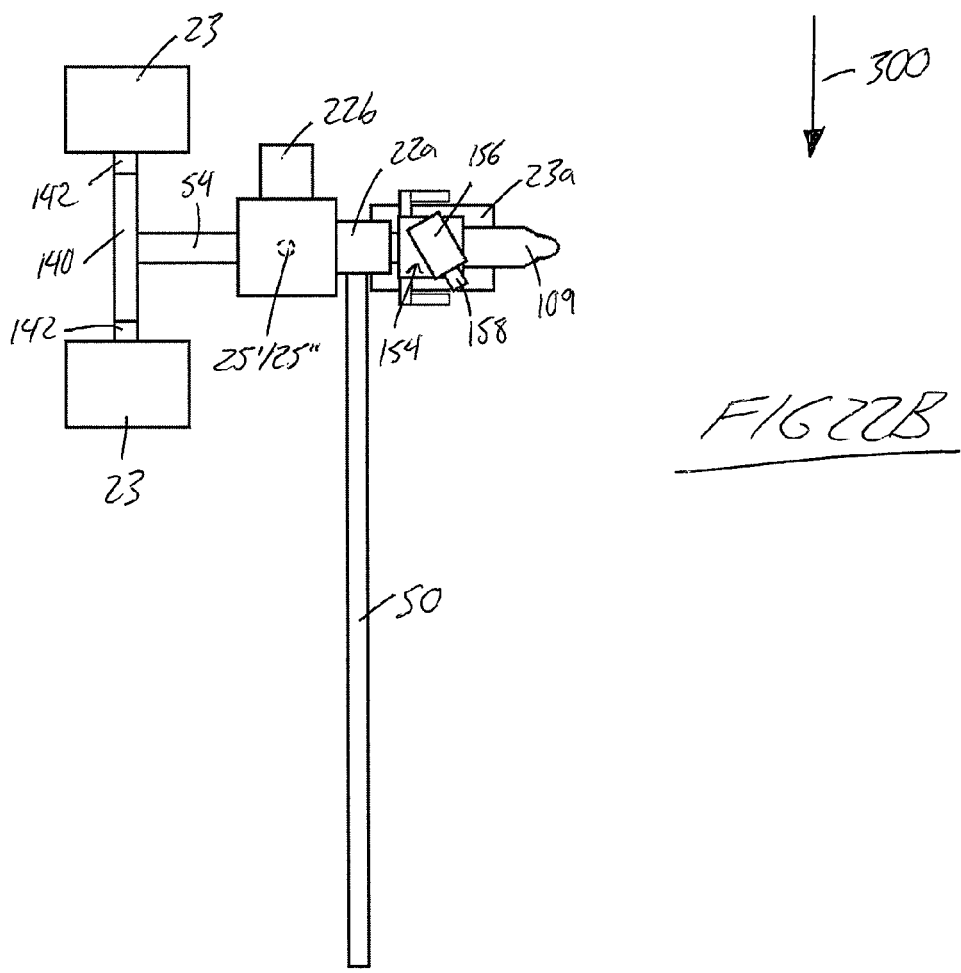

In another embodiment shown in FIGS. 22A and 22B, instead of being movable relative to the mobile platform, the installed barrier arm 50 is held stationary relative thereto, and the traffic control indicator features a STOP indication 22" (e.g. solid red light) 22a facing one direction, and a SLOW/CAUTION indication (e.g. flashing yellow/amber light) 22b facing another direction. In such instance, receipt of an indication-change command in the incoming signals from the remote control actually operates the locomotion system in a manner turning the mobile platform so as to change which of these two indications 22a, 22b faces the oncoming traffic. So in the case of the three-wheeled configuration with differentially operable drive wheels and a trailing caster wheel, operating the two drive wheels differentially of one another allows rotation of the mobile platform about an upright axis, thus allowing easy turning of the mobile platform from a position displaying the STOP indication 22a to the oncoming traffic and placing the barrier arm in the deployed position reaching across the vehicular travel path 300, as shown in FIG. 22A, to a second position displaying the SLOW/CAUTION indication 22b to the oncoming traffic and placing the barrier arm 50 out of the vehicular travel path 300 in a position parallel thereto and offset to one side thereof, as shown in FIG. 22B.

In the illustrated example, the two indication lights 22a, 22b are situated at ninety degrees from one another about the support shaft 25'/25", and the traffic barrier arm reaches in the opposite direction as that faced by the yellow/amber SLOW/CAUTION light. When the red STOP light 22a is facing oncoming traffic, the barrier arm 50 blocks the vehicular travel path 300 and the SLOW/CAUTION light 22b faces laterally away from the vehicular travel path 300 toward the roadside. Turning the mobile platform 90-degrees swings the barrier arm 50 into a position running parallel relation to the roadside and pointing downroad into the work zone to open up the travel path 300, and turns SLOW/CAUTION light 22b toward the oncoming traffic.

In another example, the two indicator lights may be at 180-degrees to one another, but this increases the amount of platform movement needed to switch between the two indication modes, reducing energy inefficiency and increasing lag time when switching between the working states of the indicator. In such embodiments, preferably the traffic control indicator commands in the incoming signals from the remote control thus perform operational commands on both the indicator and the location system, so as to perform the necessary turning of the mobile platform and also switch each light between its on and off states. Alternatively, both lights could remain illuminated at all times, in which case the switching of the traffic indication mode requires only locomotive and barrier action, and so no indicator-control command is required, as the message conveyed to the oncoming traffic is dictated solely by which light is facing said traffic. However, the illuminated state of the other light may cause confusion or distraction to drivers.

The remote controls disclosed herein may be of a type capable of communicating with multiple receivers/transceivers, whereby multiple mobile platform apparatuses and their respective traffic control indicators may be operable from a single remote control. For example, in a relatively short work zone, where a single operator has a continuous visual sight line to both ends of the work zone, two-way traffic through the work zone may controlled by the single operator. Even where a sight line to both ends of the work zone is not possible, or not continuously maintained or reliable, use of two camera-equipped mobile platforms at the two ends of the work zone may be controlled by the same operator using a singular remote control. At least one known type of commercially available remote suitable for use in the present invention allows connection to a computer through which software modifications can be made, for example by a remote control technician accessing the remote control hardware via an internet or other data network connection to the connected computer.

The present invention has been described herein with regard to preferred embodiments. However, it will be obvious to persons skilled in the art that a number of variations and modifications can be made without departing from the scope of the invention as described herein.

The invention claimed is:

1. A remote controlled mobile traffic control apparatus comprising:
   a mobile platform;
   a locomotion system installed on the mobile platform to carry the mobile platform in a movable manner over a ground surface;
   a traffic control indicator mounted on the mobile platform and operable to display different traffic control indications to oncoming traffic approaching said mobile platform; and
   a control module installed on the mobile platform and operable to receive incoming signals from one or more remote devices communicable therewith from remote distances to switch between the different traffic control indications displayed to the oncoming traffic and move the mobile platform over the ground surface via the locomotion system;
   wherein the traffic control indicator is mounted atop a support that stands upright from the mobile platform, and the apparatus comprises a self-plumbing mechanism comprising a movable connection between the support and the mobile platform by which the support can tilt relative to the mobile platform, said self-plumbing mechanism being configured to automatically tilt the support relative to the platform into a vertical orientation when the platform deviates from a level horizontal orientation.

2. The apparatus of claim 1 wherein the self-plumbing mechanism comprises a counter balance connected to the support below the movable connection, whereby tilting of the traffic control indicator in one direction out of the vertically upright position counteracted by the counter balance.

3. The apparatus claim 2 wherein the counter balance comprises one or more batteries connected to one or more electrical components of the apparatus for powering thereof.

* * * * *